US010122528B2

United States Patent
Lei et al.

(10) Patent No.: US 10,122,528 B2
(45) Date of Patent: Nov. 6, 2018

(54) NARROW BAND SYNCHRONIZATION SIGNAL

(71) Applicant: QUALCOMM Incorporated, San Diego, CA (US)

(72) Inventors: Jing Lei, San Diego, CA (US); Peter Gaal, San Diego, CA (US); Hao Xu, San Diego, CA (US); Wanshi Chen, San Diego, CA (US); Xiao feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/433,506

(22) Filed: Feb. 15, 2017

(65) Prior Publication Data

US 2017/0317816 A1 Nov. 2, 2017

Related U.S. Application Data

(60) Provisional application No. 62/336,462, filed on May 13, 2016, provisional application No. 62/333,071, (Continued)

(51) Int. Cl.
*H04L 7/04* (2006.01)
*H04W 48/16* (2009.01)
(Continued)

(52) U.S. Cl.
CPC .......... *H04L 7/041* (2013.01); *H04J 11/0076* (2013.01); *H04J 13/10* (2013.01);
(Continued)

(58) Field of Classification Search
CPC ... H04L 7/033; H04L 7/04; H04L 7/08; H04L 7/041; H04L 7/042; H04L 7/0008;
(Continued)

(56) References Cited

U.S. PATENT DOCUMENTS

2014/0198874 A1* 7/2014 Kim ...................... H04L 1/0041
375/295
2014/0321450 A1* 10/2014 Zhang ................... H04L 7/0016
370/350
(Continued)

OTHER PUBLICATIONS

International Search Report and Written Opinion—PCT/US2017/018861—ISA/EPO—dated May 12, 2017.
(Continued)

*Primary Examiner* — Zewdu Kassa
(74) *Attorney, Agent, or Firm* — Arent Fox, LLP

(57) ABSTRACT

In order to address the needs of narrow band communication, eNB-based processing and/or UE-based processing is provided to achieve robust detection of cell ID and SFN timing location using NB-SSS. A base station constructs a NB-SSS signal using a root index of a Zadoff-Chu (ZC) sequence, a scrambling code, a cyclic shift or phase ramping sequence, and an interleaving sequence, wherein a combination of the ZC root index, the scrambling code index, the cyclic shift or phase ramping sequence index, and the interleaving sequence index signals information for a cell identifier (e.g., PCID) and frame timing. The ZC sequence used may be a long ZC sequence constructed to span a total number of tones allocated to an SSS sequence or may be a concatenation of multiple ZC sequences, wherein the concatenated ZC sequences span a total number of tones allocated to an SSS sequence.

25 Claims, 18 Drawing Sheets

Related U.S. Application Data filed on May 6, 2016, provisional application No. 62/329,924, filed on Apr. 29, 2016.

(51) Int. Cl.
*H04J 11/00* (2006.01)
*H04J 13/10* (2011.01)
*H04J 13/00* (2011.01)

(52) U.S. Cl.
CPC ........... *H04J 13/107* (2013.01); *H04W 48/16* (2013.01); *H04J 13/0062* (2013.01)

(58) Field of Classification Search
CPC ....... H04L 7/02; H04L 7/0331; H04L 7/0337; H04L 27/2647; H04L 1/20; H04L 1/0003; H04L 1/0071; H04L 5/0007; H04N 5/4401; H04B 1/30; H04B 1/28
USPC .......................... 375/362, 354, 295, 219, 316
See application file for complete search history.

(56) References Cited

U.S. PATENT DOCUMENTS

2016/0013879 A1* 1/2016 Webb ................ H04W 56/0015 370/336
2017/0251455 A1* 8/2017 Shin .................. H04W 56/0015
2017/0311276 A1* 10/2017 Tsai .................. H04W 56/0045

OTHER PUBLICATIONS

Qualcomm Incorporated: "NB-PSS and NB-SSS Design (Revised)", 3GPP TSG RAN WG1 NB-IoT Ad-Hoc Meeting, R1-161981, Mar. 22, 2016, XP051081092, Retrieved from the Internet: URL:http://www.3gpp.org/ftp/tsg_ran/WG1_RL1/TSGR1_AH/LTE_NB-IoT_1603/Docs/ [retrieved on Mar. 22, 2016], 24 Pages.

Qualcomm Incorporated: "NB-SSS Design", 3GPP Draft, R1-163407, NB-SSS Design, 3rd Generation Partnership Project (3GPP), Sophia-Antipolis Cedex, France, vol. TSG RAN, No. Busan, Korea, Apr. 11, 2016-Apr. 15, 2016, Apr. 18, 2016, XP051090393, Retrieved from the Internet: URL:http://www.3gpp.org/ftp/tsg_ran/WG1_RL1/TSGR1_84b/Docs/ [retrieved on Apr. 18, 2016].

Wi Rapporteur (Ericsson): "RAN1 agreements for Rel-13 NB-IoT", 3GPP TSG-RAN WG1 Meeting #84bis, R1-163943, Apr. 27, 2016, XP051090321, Retrieved from the Internet: URL:http://www.3gpp.org/ftp/tsg_ran/WG1_RL1/TSGR1_84b/Docs/ [retrieved on Apr. 27, 2016], 14 Pages.

\* cited by examiner

NARROW BAND SYNCHRONIZATION SIGNAL

CROSS-REFERENCE TO RELATED APPLICATIONS

This application claims the benefit of U.S. Provisional Application Ser. No. 62/329,924, entitled "ROBUST NARROW BAND SECONDARY SYNCHRONIZATION SIGNAL" and filed on Apr. 29, 2016; U.S. Provisional Application Ser. No. 62/333,071, entitled "ROBUST NARROW BAND SECONDARY SYNCHRONIZATION SIGNAL" and filed on May 6, 2016; U.S. Provisional Application Ser. No. 62/336,462, entitled "ROBUST NARROW BAND SECONDARY SYNCHRONIZATION SIGNAL" and filed on May 13, 2016, each of which is expressly incorporated by reference herein in its entirety.

BACKGROUND

Field

The present disclosure relates generally to communication systems, and more particularly, to aspects of a Narrow Band (NB) Secondary Synchronization Signal (SSS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology.

In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NB communications technology and beyond may be desired. These improvements may also be applicable to other multi-access technologies and the telecommunication standards that employ these technologies.

In Narrow Band (NB) wireless communication, such as narrow band internet-of-things (NB-IOT) or enhanced Machine-Type Communications (eMTC), wireless communications may involve limited bandwidth. For example, in NB-IOT, wireless communication may be limited to a single Resource Block (RB). In eMTC, communication may be limited to six RBs. Such limited resources lead to unique challenges in transmitting data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In NB communication, there may be two downlink synchronization signals, a primary synchronization signal (PSS) and a secondary synchronization signal SSS, transmitted by an evolved node B (eNB) and used by a user equipment (UE) to obtain the cell identity and frame timing. It is important that the UE be able to reliably receive the SSS and determine the cell ID and frame timing.

Aspects presented in this application allow the eNB to construct a SSS that allows robust detection by a UE of cell ID and frame timing in both synchronized and asynchronized multi-cell deployment.

In an aspect of the disclosure, a method, a computer-readable medium, and an apparatus are provided. The apparatus constructs a NB SSS using a ZC root index, a scrambling code, a cyclic shift or phase ramping sequence, and an interleaving sequence, wherein a combination of the ZC root index, the scrambling code index, the cyclic shift or phase ramping sequence index, and the interleaving sequence index signals information for a cell identifier (e.g., PCID) and frame timing. The apparatus transmits the SSS using a NB. The ZC sequence used may be a long ZC sequence constructed to span a total number of tones allocated to an SSS sequence or may be a concatenation of multiple ZC sequences, wherein the concatenated ZC sequences span a total number of tones allocated to an SSS sequence.

In another aspect, a receiver apparatus may receive a secondary SSS comprising multiple symbols and use cross-correlation at each symbol of the SSS to decode the SSS in order to determine a cell ID and timing information. The receiver may use hypothesis testing for a plurality of hypotheses to decode the SSS and may use coding or mapping constraints to reduce a number of the plurality of hypotheses to be tested.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
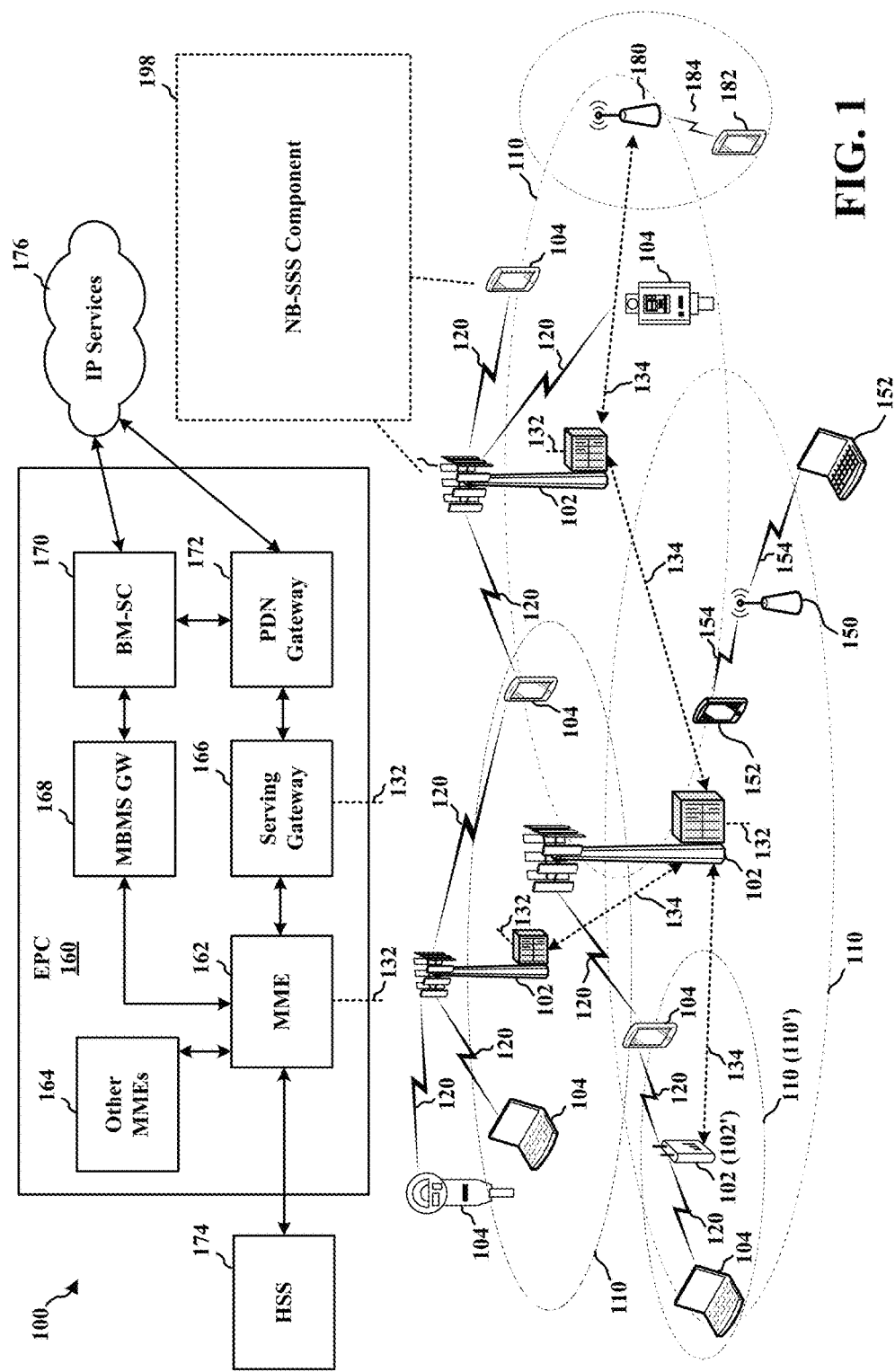
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up a portion of the coverage area (not shown). The wireless communication network 100 may include base stations 102, 180 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies.

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may be configured to include an NB-SSS component 198.

Figure 2:
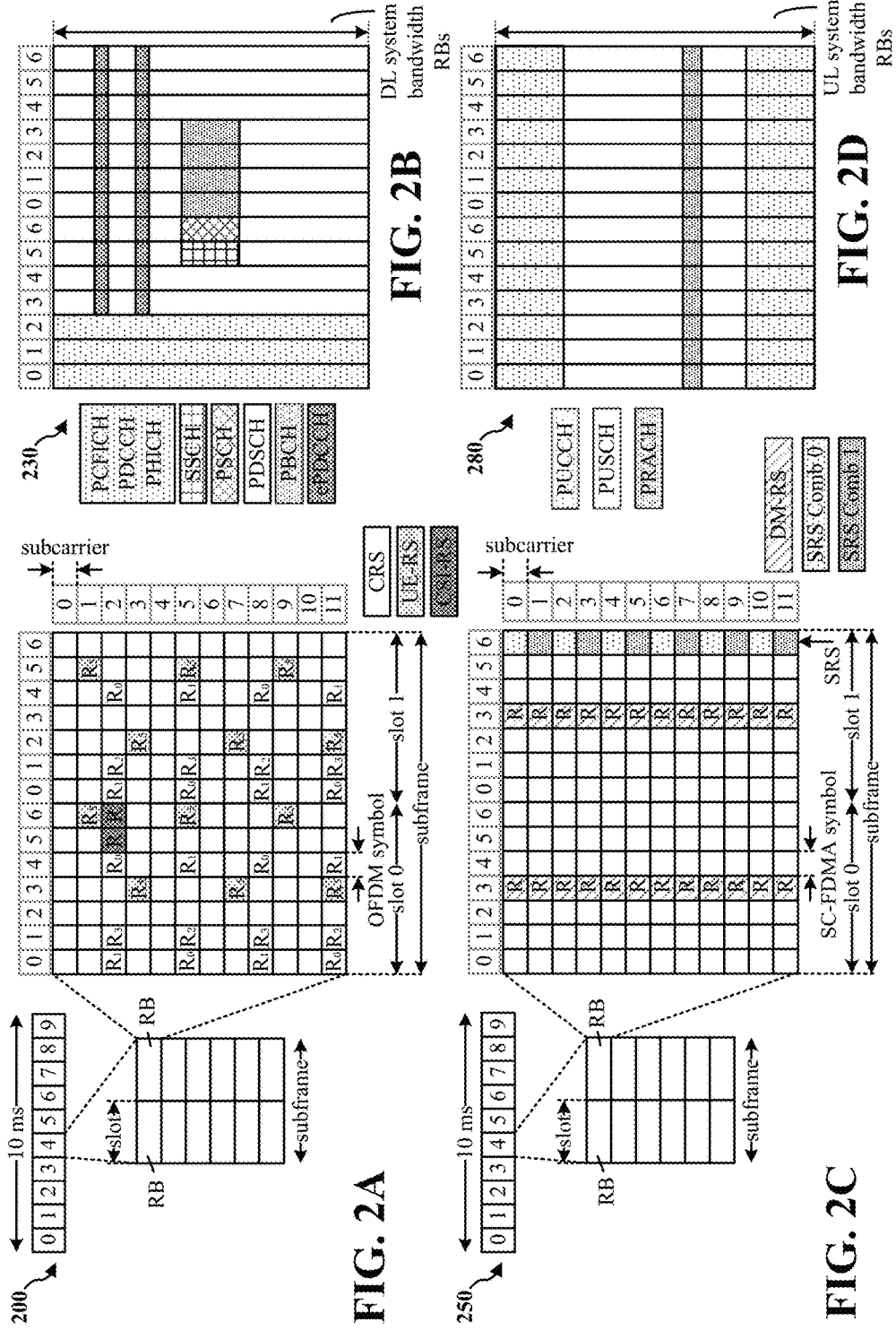
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 18:
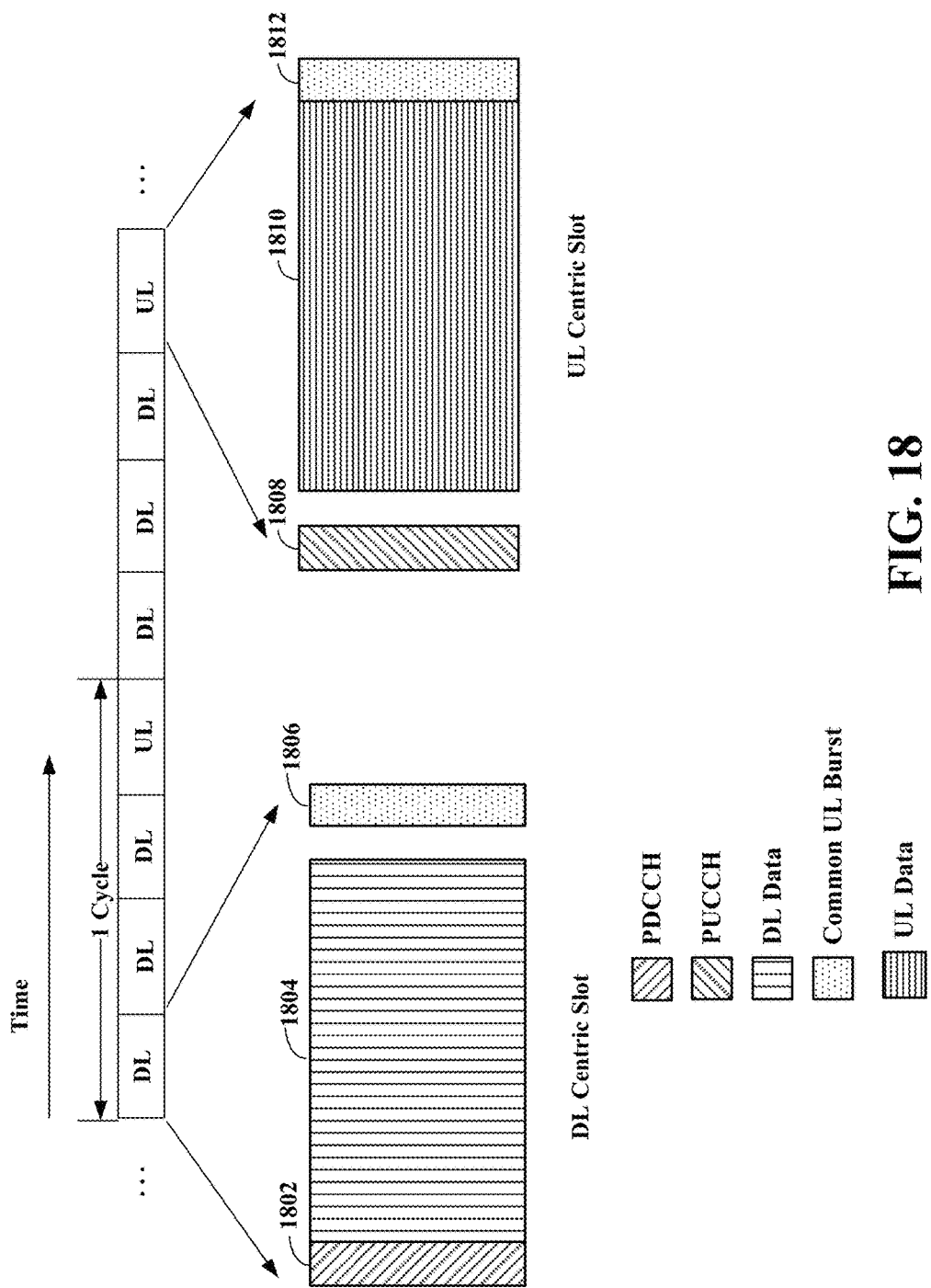
FIG. 18 illustrates an example 5G slot structure.

In another example, the NB-SSS may have a 5G frame structure, e.g., as illustrated in FIG. 18. A NB-SSS signal may span multiple DL OFDM symbols of a 5G time slot, and its bandwidth may be larger than 180 kHz due to the flexible selection of subcarrier spacing.

FIG. 18 illustrates an example 5G slot structure comprising DL centric slots and UL centric slots. In NR, a slot may have a duration of 0.5 ms, 0.25 ms, etc., and each slot may have 7 or 14 symbols. A resource grid may be used to represent the time slots, which is also referred to as PRBs. The resource grid may be divided into multiple resource elements REs. The number of bits carried by each RE depends on the modulation scheme.

A slot may be DL only or UL only, and may also be DL centric or UL centric. FIG. 18 illustrates an example DL centric slot. The DL centric slot may comprise a DL control region 1802, e.g., in which in which various scheduling and/or control information corresponding to various portions of the DL-centric subframe are transmitted. The control information may comprise a PDCCH, as illustrated in FIG. 18.

The DL-centric subframe may also include a DL data portion 1804. The DL data portion 1804 may sometimes be referred to as the payload of the DL-centric subframe. The DL data portion 1804 may include the communication resources utilized to communicate DL data from the scheduling entity (e.g., a UE or a base station (BS)) to the subordinate entity (e.g., a UE). In some configurations, the DL data portion 1804 may comprise a physical DL shared channel (PDSCH) that carriers user data, broadcast system information not transmitted through the PBCH such as system information blocks (SIBs), and paging messages, etc.

The DL-centric subframe may also include a common UL portion 1806. The common UL portion 1806 may sometimes be referred to as an UL burst, a common UL burst, and/or various other suitable terms. The common UL portion 1806 may include feedback information corresponding to various other portions of the DL-centric subframe. For example, the common UL portion 1806 may include feedback information corresponding to the control portion 1802. Non-limiting examples of feedback information may include an ACK signal, a NACK signal, a HARQ indicator, and/or various other suitable types of information. The common UL portion 1806 may include additional or alternative information, such as information pertaining to random access channel (RACH) procedures, scheduling requests, and various other suitable types of information. The end of the DL data portion 1804 may be separated in time from the beginning of the common UL portion 1806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric subframe and alternative structures having similar features may exist without necessarily deviating from the aspects described herein.

Similar to the DL based slot, the UL based slot may comprise a control region 1808, e.g., for PDCCH transmissions. The control region 1802, 1808 may comprise a limited number of symbols at the beginning of a slot. The UL-centric subframe may also include an UL data portion 1810. The UL data portion 1810 may sometimes be referred to as the payload of the UL-centric subframe. The UL portion may refer to the communication resources utilized to communicate UL data from the subordinate entity (e.g., a UE) to the scheduling entity (e.g., a UE or a BS). In some configurations, the control portion 1808 may be a physical UL shared channel (PUSCH).

As illustrated in FIG. 18, the end of the control portion 1808 may be separated in time from the beginning of the UL data portion 1810. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1812. The common UL portion 1812 in FIG. 18 may be similar to the common UL portion 1812 described above with reference to FIG. 18. The common UL portion 1806 may additionally, or alternatively, include information pertaining to a channel quality indicator (CQI), sounding reference signals (SRSs), and various other suitable types of information.

The UL centric slot may comprise a guard period. The DL control region 1802, may comprise a limited number of symbols at the beginning of a slot and the ULCB region may comprise one or two symbols of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, NR may be based on an SC-FDM or OFDM waveform in the ULRB.

Figure 3:
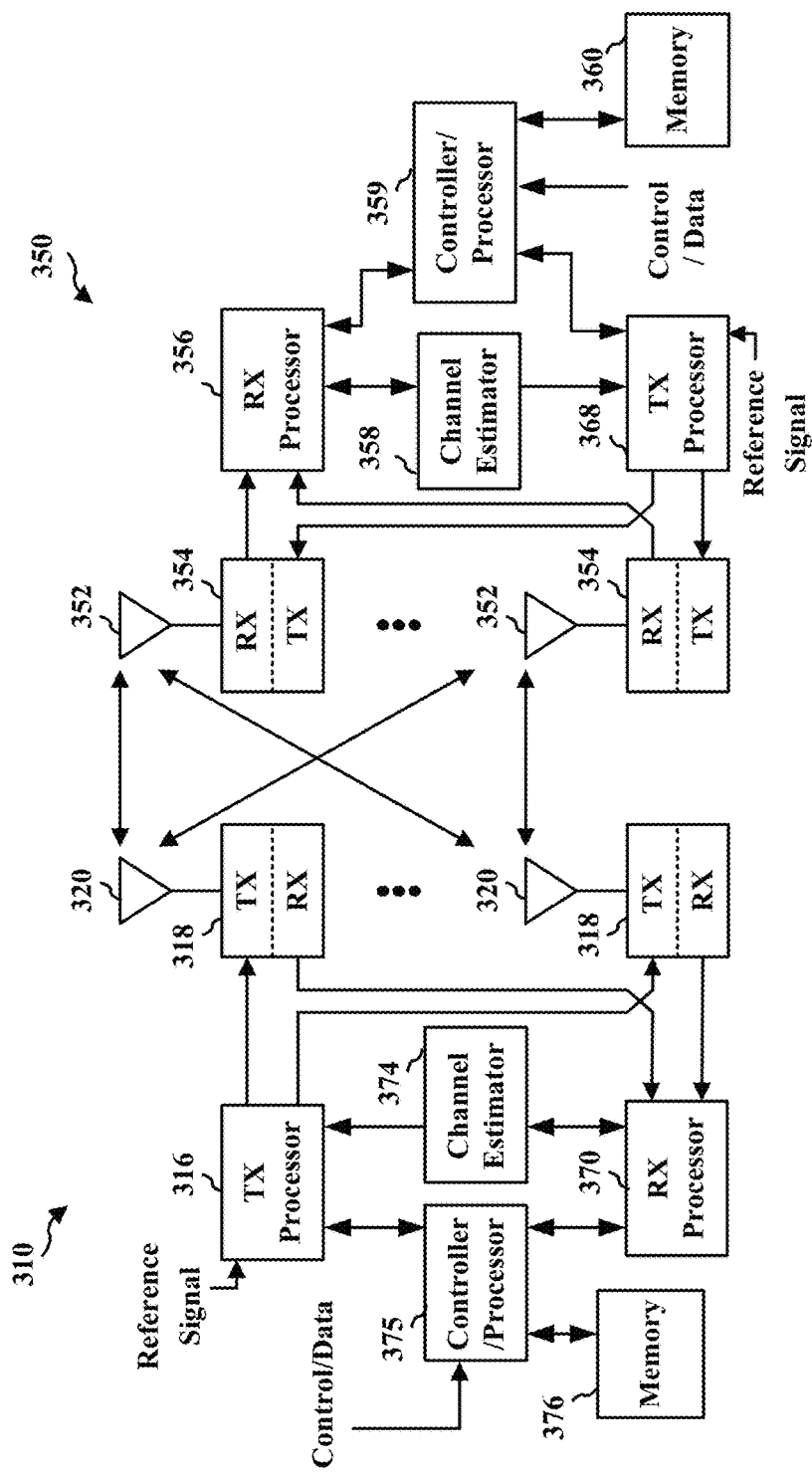
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

NB wireless communication involves unique challenges due to the limited frequency dimension of the narrow band. One example of such NB wireless communication is NB-IoT, which is limited to a single resource block (RB) of system bandwidth, e.g., 180 kHz. In 5G, the NB bandwidth may be different than for LTE, e.g., due to the flexible selection of OFDM subcarrier spacing. Another example of NB wireless communication is enhanced Machine-Type-Communication (eMTC), which is limited to six RBs of system bandwidth. This narrow band communication may be deployed "in-band," utilizing resource blocks within a normal carrier (e.g., an LTE or 5G carrier), or in the unused resource blocks within a carrier's guard-band, or "stand-alone" for deployments in dedicated spectrum. Multiple users, e.g., UEs may utilize the narrow band. While only some of the UEs may be active at a particular time, the NB communication should support such multi-user capacity.

In LTE, there are two downlink synchronization signals, a primary synchronization signal (PSS) and a secondary synchronization signal (SSS), transmitted by the eNB and used by the UE to obtain the cell identity and frame timing. For example, the PSS may be linked to the cell identity within a group, and the SSS may be is linked to both the cell identity group and the individual cell identity within the group. The PSS and SSS may be detected by the UE and used in order to identify the cell identify group and the individual cell ID within the cell identity group.

Due to the resource limitations for NB communication, it might not be possible or not desirable to use a legacy synchronization signal, and SSS in particular.

A Narrow Band Secondary Synchronization Signal (NB-SSS) may be used to convey a cell ID of an eNB and frame timing for the eNB, e.g., system frame number (SFN) locations. Resource allocation for NB-SSS may be fixed to 180 kHz BW and 11 OFDM symbols, for example. Out of 12 tones, e.g., one tone may be reserved for a null tone. A mapping may then be established for an NB-SSS symbol and each of 11 remaining tones allocated for the SSS.

An NB-SSS signal may be used to signal cell ID (PCID) and 4 SFN locations within 80 ms TTI, for example. The NB-SSS may use the timing and frequency references established by the corresponding NB-PSS. Additionally, the NB-SSS signal can be used to track the residual timing and frequency offsets after NB-PSS processing.

NB-SSS symbol structure might need to be compliant with legacy LTE.

It is important that the NB-SSS provide robust detection of cell ID and SFN location both in synchronized and asynchronized multi-cell deployment.

Figure 4:
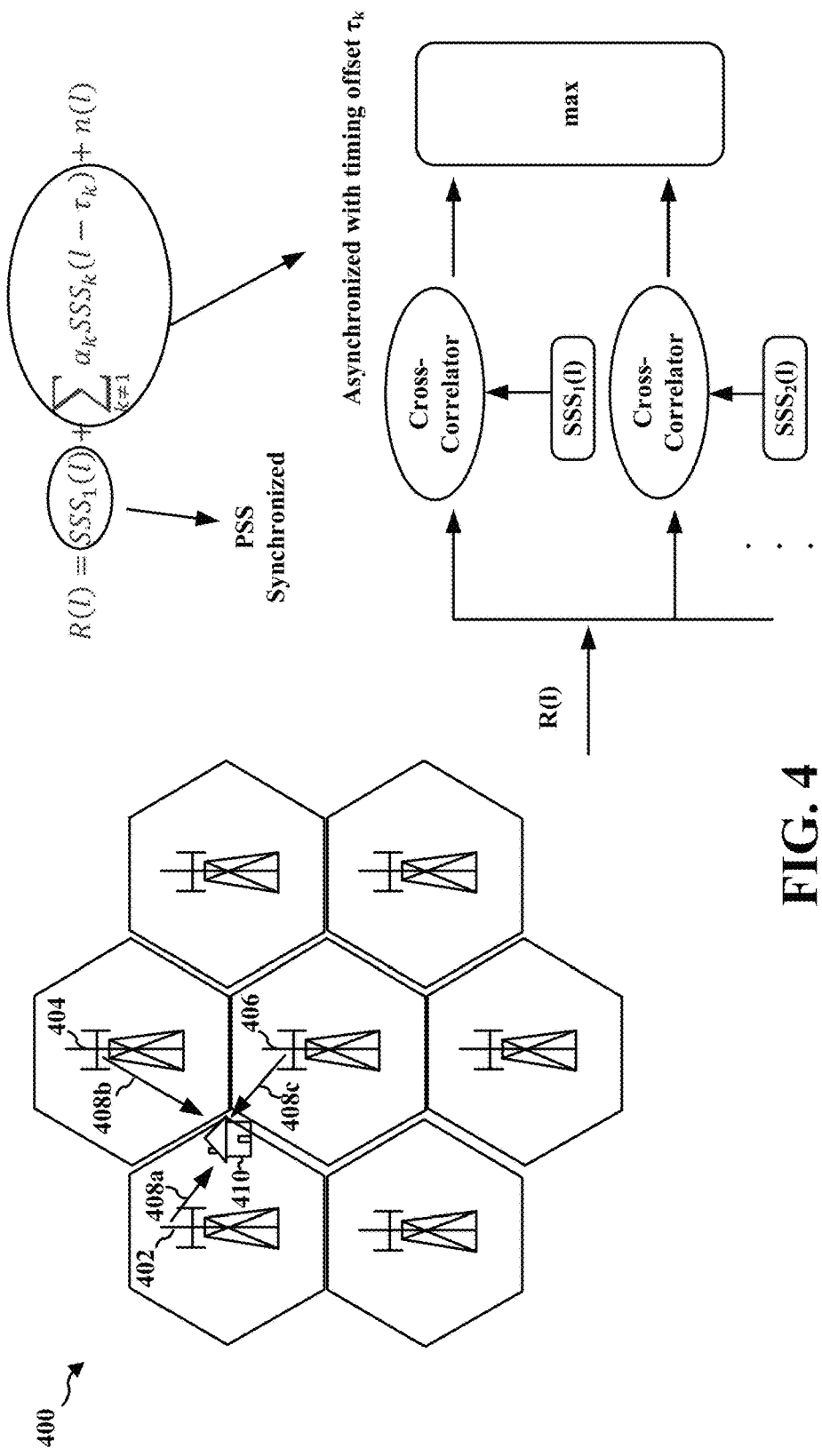
FIG. 4 is a an example multi-cell system for wireless communication in accordance with aspects presented herein.

FIG. 4 illustrates an example multi-cell system 400 that includes eNBs 402, 404, and 406 each transmitting SSS 408a, 408b, 408c. UE 410 receives three SSS, 408a from target cell, and two interfering SSS 408b, 408c from interfering eNBs 404 and 406. The signal R(l) received by UE 410 at time l is:

$$R(l) = SSS_1(l) + \sum_{k \neq 1} \alpha_k SSS_k(l - \tau_k) + n(l)$$

$SSS_1(l)$ is the PSS synchronized SSS received from target eNB 402. Along with this synchronized SSS, the UE 410 also receives interfering SSS that are asynchronized with timing offset $\tau_k$, as well as other noise, n(l). In this calculation, k is an index for each of the interfering transmissions, and a is the percentage of the signal that the UE receives. As in this equation, the signal received by the UE includes the synchronized signal $SSS_1(l)$ from its target eNB and a sum of all other interfering signals and other noise.

It is important for the UE to be able to resolve SSS detection ambiguity. In the absence of a timing offset, the "full" cross-correlation between two length-L SSS sequences are minimized and upper bounded by self-correlation. For example, $\Sigma_{l=1}^{L} SSS_1(l) SSS_2^*(l) < \Sigma_{l=1}^{L} |SSS_k(l)|^2$, where $SSS_k(l) = 0$ for $k=1,2$ if $l \notin [1,L]$ In the presence of a timing offset, the "partial" cross correlation may surpass the "full" cross-correlation for some $\Delta\tau \neq 0$. For example, $\Sigma_{l=1}^{L} SSS_1(l) SSS_2^*(l) < \Sigma_{l=1}^{L} SSS_1(l) SSS_2^*(l+\Delta\tau)$
where $SSS_k(l)=0$ for $k=1,2$ if $l \notin [1,L]$ When the partial cross correlation is close to self-correlation, the UE may be confused by equally strong side lobes in SSS detection, which may lead to ambiguity in cell ID or frame timing detection. For example, a critical timing offset $\Delta\tau$ may lead to $$\sum_{l=1}^{L} SSS_1(l) SSS_2^*(l+\Delta\tau_c) \geq 0.5 \sum_{l=1}^{L} |SSS_k(l)|^2 \text{ for } k = 1, 2$$

A robust SSS design should remove the SSS detection ambiguity without degrading the capacity of NB-SSS channel. Aspects presented herein provide for a robust NB SSS design method using either a long ZC sequence or the concatenation of short ZC sequences.

NB-SSS Using Long ZC Sequences

An NB-SSS may be constructed using a long ZC sequence. The ZC sequence may span the entire time duration of the SSS transmission. For example, 132 tones may be allocated for an SSS sequence, mapped to 1 PRB and 11 OFDM symbols. Thus, the ZC sequence should span the entire 132 tones. The ZC sequence may be somewhat shorter or longer than the tones allocated for the SSS transmission. In this case, the ZC sequence may be truncated to reduce the ZC sequence or cyclically extended in order to fit the total number of tones allocated to an SSS. The SSS sequence may be constructed using a ZC root index and symbol-wise cyclic shifts. Thus, a cyclic shift per symbol may be applied.

Potential selections for the root index may be pruned, or limited to a subset, to obtain a subset resilient to time/frequency uncertainty.

The cyclic shifts may be applied in either the time domain or the frequency domain. The cyclic shift may be configured as a constant or may be symbol specific. The symbol-wise cyclic shifts may be randomized, or may be selected from a set of pre-determined values. Alternately, a hopping pattern of symbol-wise cyclic shifts may be systematically configured. For example, a hopping pattern may be based on forward error correction (FEC) schemes having desirable distance properties.

In addition to the use of the ZC root index and the symbol-wise cyclic shift, scrambling may also be used to construct the SSS. The scrambling may be performed in time or frequency domain. The scrambling may be binary or poly-phase. The selection of the scrambling sequence to be used to construct the SSS can be made a function of both physical cell identifier (PCID) and SFN location.

Interleaving may also be used to construct the SSS. Thus, in addition to the use of the ZC root index, cyclic shift, and scrambling, interleaving may also be used to improve the robustness of detection for PCID and SFN location. The interleaving may be a symbol wise, or per symbol, interleaving. Permutation may be applied to the SSS in the time domain.

The SSS may be constructed based on any combination of these aspects. A receiver may use additional processing in order to receive the SSS. For example, a receiver may perform blind detection in order to address the ambiguity of SFN timing for the SSS. The UE may conduct hypothesis testing using a limited number of hypotheses. The limitation may be based on rules of SSS construction, for example. The UE may use blind detection in order to identify the correct PCID and SFN timing for the SSS.

Figure 12:
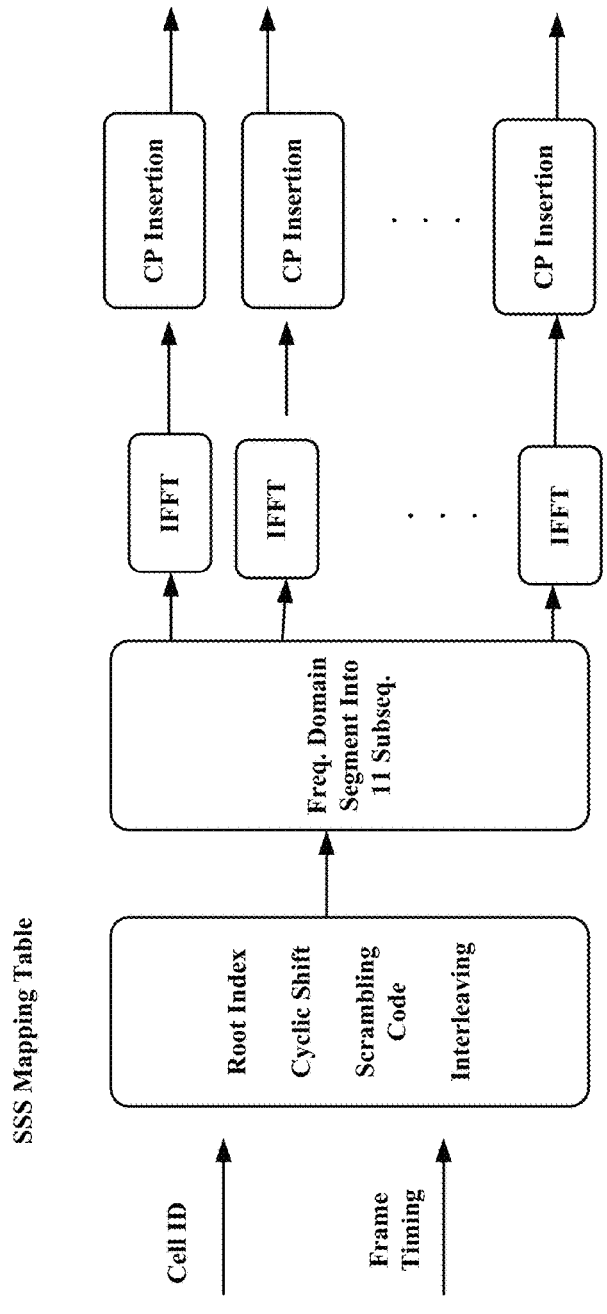
FIG. 12 illustrates an example diagram of NB-SSS generation according to aspects described herein.

FIG. 12 illustrates an example diagram 1200 of NB-SSS generation according to aspects described herein. In FIG. 12, the source information, e.g., the cell ID for the eNB and the frame timing or SFN may be used to construct the NB-SSS using at least one root index, cyclic shifts, scrambling, and/or interleaving. For example, the frequency domain segment allocated for the SSS may include subsections, or 11 tones. Inverse Fast Fourier Transform (IFFT) and (CP) cyclic prefix may be used in order to generate each of the symbols of the NB-SSS.

Thus, the PCID may be indicated by a combination of ZC root index and scrambling code index. A Root index u may be used to construct a size of 131 ZC sequence, where $u \in [3, 128]$. A sequence index may comprise a size of a 128 Hadamard matrix, where $\{S_0=0, S_1=31, S_2=63, S_3=127\}$. A 20 ms frame boundary within a 80 ms interval may be indicated by one of 4 time-domain cyclic shifts, where $$SSS(n) \triangleq \exp\left(\frac{j\pi u n(n+1)}{131}\right) b_p(n) \exp\left(\frac{j 2\pi n}{dmax} l_q\right),$$

$$n = 0, 1, \ldots 131; q = 0, 1, 2, 3$$

$$b_p(n) \triangleq Hadamard_{S_p}^{128 \times 128}(\mod(n, 128)), p = 0, 1, 2, 3$$

$$dmax = 132$$

In another example, a value of $d'_{max}$ and $l'_q$ may be optimized, and the pattern of scrambling code $b'_{p(n)}$ can be optimized. In this calculation, $d'_{max}$ denotes the maximum range of phase ramping in frequency domain, which also equals the maximum range of cyclic shift in the time domain, j is the unit imaginary number, and u denotes the root index of the Zadoff-Chu base sequence, p denotes the index of the scrambling code index, q denotes the index of the phase ramping sequence, $l'_q$ denotes the amount of phase ramping applied to a specific base sequence, and n denotes the sampling index in the frequency domain for an SSS sequence. An additional phase rotation term $\rho_{(n)}$ may be inserted, where $$\rho_{(n)} \rightarrow SSS'(n) \triangleq \exp\left(\frac{j\pi u n(n+1)}{131}\right) b'_p(n) \exp\left(\frac{j 2\pi n}{d'_{max}} l'_q\right) \rho(n)$$

Figure 13:
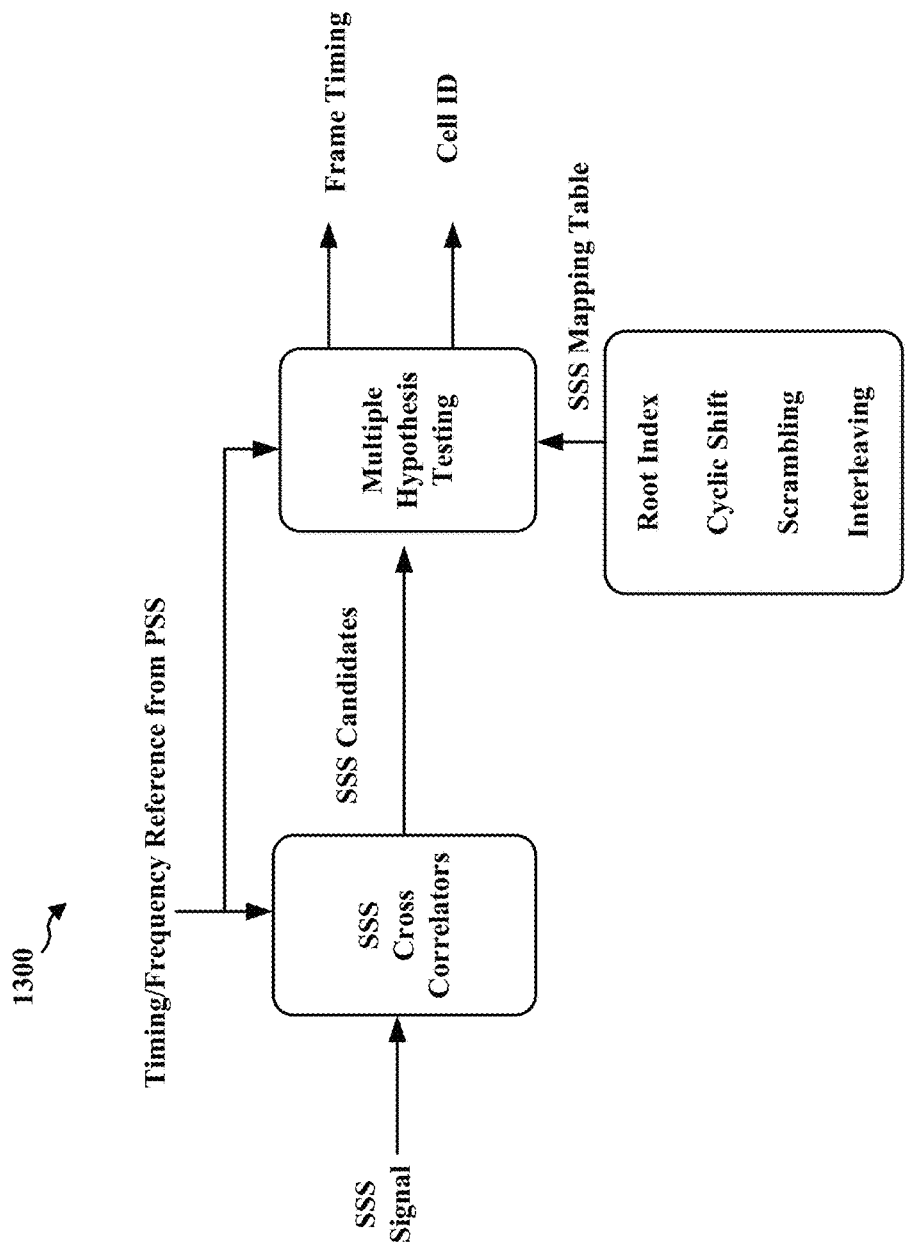
FIG. 13 illustrates an example diagram of UE processing for SSS ambiguity resolution in accordance with aspects presented herein.

In this calculation, q denotes the index of the phase ramping, e.g., cyclic shifting, sequence applied to the SSS signal. For example, four possible values of q are $\{0,1,2,3\}$, which may be used to signal the 20 ms frame boundary. In another example, a UE may perform additional processing to resolve the ambiguity of SFN timing. The UE may conduct a limited number of hypothesis testing, e.g., based on the rules of SSS construction in order to identify the cell ID and SFN timing. FIG. 13 illustrates an example diagram 1300 of UE processing for SSS ambiguity resolution. As illustrates in FIG. 13, the UE receives the SSS signal and receives timing and/or frequency reference information from a PSS associated with the SSS. The UE uses SSS cross correlators to identify SSS candidates. The UE then uses those SSS candidates as well as the timing and/or frequency information from the PSS to perform hypothesis testing for multiple hypotheses. The number of hypotheses tested may be limited based on the rules of SSS construction. For example, the UE may use SSS mapping information including information based on root index, cyclic shift, scrambling, and/or interleaving. Using the hypothesis testing, the UE determines a frame timing and cell ID from the received SSS signal.

One example of an algorithm for multiple hypothesis testing may comprise, e.g., SSS-Based Processing. In this example, for different SFN timing hypotheses, cross-correlation may be calculated for all candidate SSS sequences, e.g., at all possible 20 ms boundaries within an 80 ms interval, and may be represented by $\gamma(m, l)$, where m is the cell ID of SSS candidate and $l \in \{0, 1, 2, 3\}$ is the index of SFN timing as indexed to the 20 ms boundaries, and $\gamma$ is denotes the output of cross-correlator between the received signal and a local reference SSS signal, which is a function of cell ID "m" and SFN timing hypothesis "l". Then, the pattern of $[\gamma(m, 0) \gamma(m, 1) \gamma(m, 2) \gamma(m, 3)]$ may be compared for different hypotheses of cell ID m and SFN timing l. Then, a combination of "m" and "l" may be selected that exhibits a best match to SSS Mapping Table. This enables the number of hypotheses to be limited for the detection of cell ID and SFN timing.

Another example, of an algorithm for multiple hypothesis testing may comprise, e.g., PBCH based processing. In this example, for different SFN timing hypotheses, the results of PBCH decoding outcome may be compared and the SSS sequences corresponding to better decoding results may be selected. This enables the number of hypotheses to be limited for the hypothesis testing.

NB-SSS Using Short ZC Sequences

In another example, the SSS may be constructed using a concatenation of short ZC sequences whose total span equals the time duration of SSS transmission.

For example, SSS sequences may be constructed based on a ZC root index and symbol-wise cyclic shifts. Potential choices for root index may be pruned, or removed to generated a subset, in order to obtain a subset unused by NB-PSS and resilient to time/frequency uncertainty. Each short ZC sequence may be mapped to one SSS symbol. The mapping of root index and cyclic shift may be permuted in a periodic manner. For example, the periodicity of permutation may be configurable within one SSS transmission. The permutation may change per symbol, or every n symbols.

SSS symbols may be concatenated according to coding and/or mapping constraints that guarantee desirable distance properties and un-ambiguous SSS detection. For example, shortened or punctured FEC codes such as Reed Solomon, BCH, Reed Muller, etc. may be used to concatenate SSS symbols.

In addition, a symbol-wise interleaver may be applied on top of a coded SSS sequence. A symbol-wise binary or poly-phase code cover can also be applied on top of a coded SSS sequence. Scrambling codes may be applied in either the frequency domain or the time domain, e.g., as described in connection with the use of a long ZC sequence.

Low Complexity NB-SSS Receiver

A receiver may simplify sequence-wise cross correlation. The receiver may use symbol-wise cross-correlation to decode a received SSS signal. The magnitude of the symbol-wise cross correlation may provide soft information on SSS detection. Coding and/or mapping constraints may be used by the receiver to reduce the number of hypotheses to be tested. A sum of cross-correlation may be coherently combined. The symmetric property of cross-correlation, scrambling, and/or cyclic shifting may be exploited to reduce the number of arithmetic operations performed by the receiver in order to decode the SSS.

Figure 5:
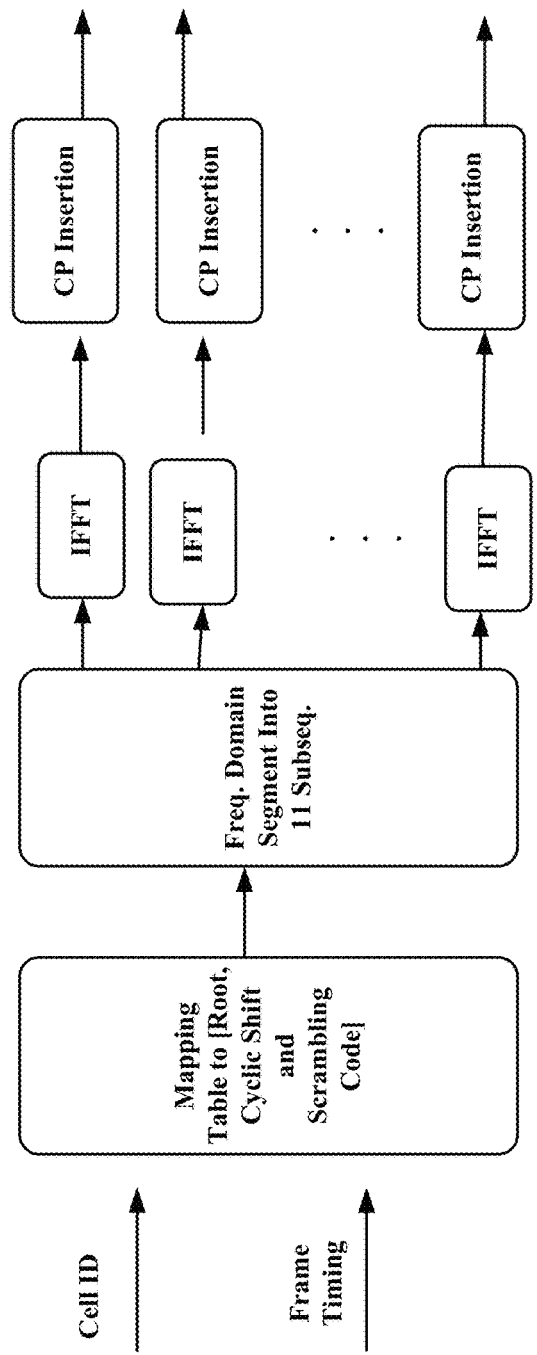
FIG. 5 is a diagram of constructing an NB SSS in accordance with aspects presented herein.

FIG. 5 illustrates an example diagram 500 of NB-SSS generation according to aspects described herein. In FIG. 5, the source information, e.g., the cell ID for the eNB and the frame timing or SFN may be used to construct the NB-SSS using at least one root index, cyclic shifts, and/or scrambling. For example, the frequency domain segment allocated for the SSS may include subsections, or 11 tones. Inverse Fast Fourier Transform (IFFT) and (CP) cyclic prefix may be used in order to generate each of the symbols of the NB-SSS.

Figure 6:
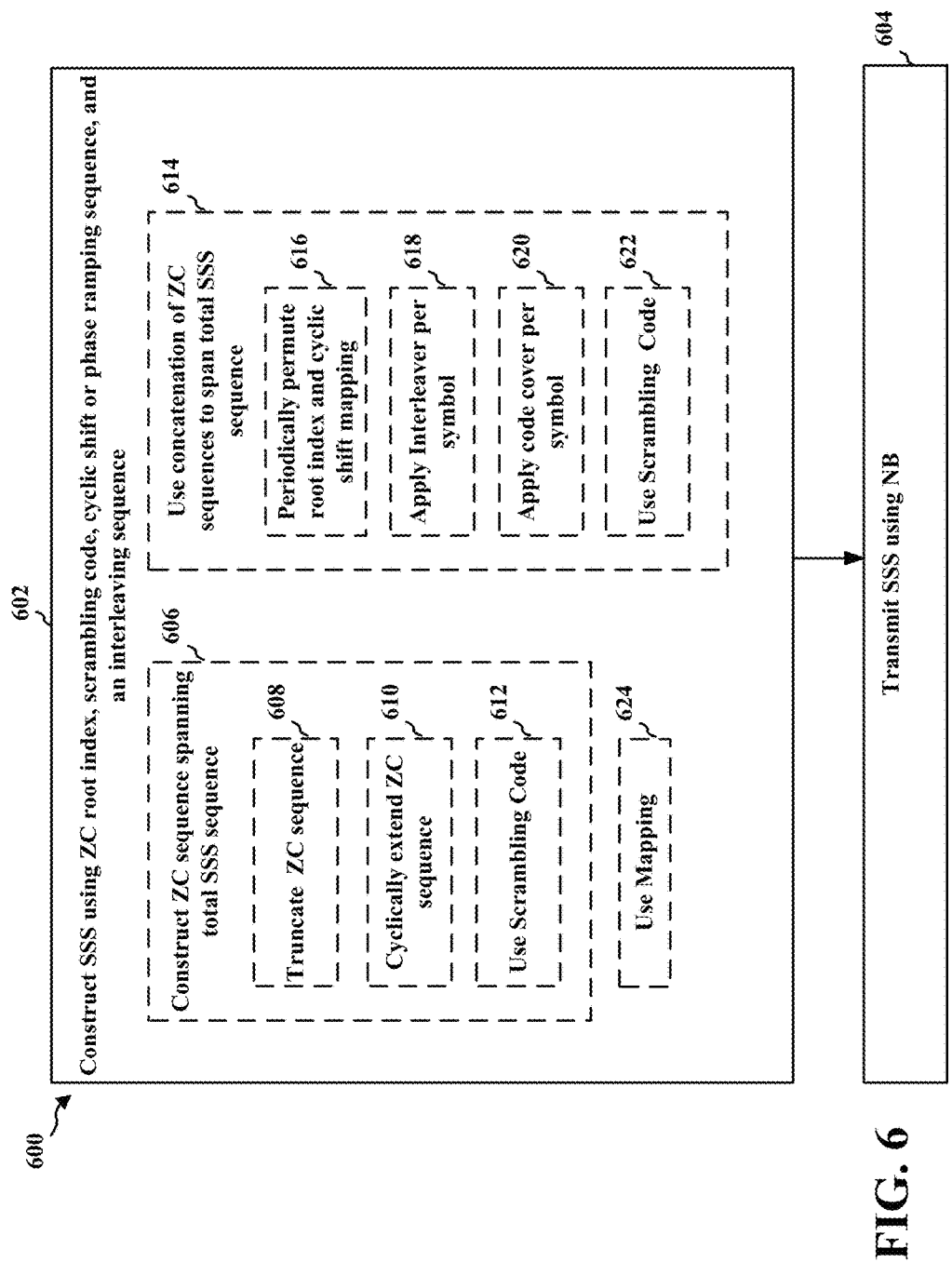
FIG. 6 is a flowchart of a method of wireless communication in accordance with aspects presented herein.

FIG. 6 is a flowchart 600 of a method of NB wireless communication. The method may be performed by an eNB (e.g., the base station 102, 180, eNB 310, 402, 404, 406, 1050, apparatus 702, 702').

At block 602, the eNB constructs an SSS using a ZC root index, a scrambling code, a cyclic shift or phase ramping sequence, and an interleaving sequence, wherein a combination of the ZC root index, the scrambling code index, the cyclic shift or phase ramping sequence index, and the interleaving sequence index signals information for a cell identifier (e.g., PCID) and frame timing information (e.g., SFN timing information). For example, each combination of ZC root index and scrambling code index may uniquely identify a specific cell identifier. The cyclic shift conveys frame timing information. The per symbol cyclic shift is also referred to herein as a symbol-wise cyclic shift.

At block 604, the eNB transmits the SSS using the NB. Optional aspects of the method in FIG. 6 are illustrated using a dashed line.

The ZC sequence may span the entire duration of the tones allocated to the SSS sequence. Thus, at 606, the eNB may construct a ZC sequence that spans a total number of tones allocated to an SSS sequence. If the ZC sequence is not the exact size of the allocation for the SSS sequence, the eNB may truncate the ZC sequence at block 608 or cyclically extend the ZC sequence at block 610 to fit the total number of tones allocated to the SSS sequence.

The cyclic shifts may be applied in either the time domain or the frequency domain. The symbol-wise cyclic shifts may be randomized. Alternately, a hopping pattern of symbol-wise cyclic shifts may be systematically configured. For example, a hopping pattern may be based on forward error correction (FEC) schemes having desirable distance properties.

Constructing the SSS further may further include scrambling at block 612, e.g., using a scrambling code in combination with the ZC root index in order to convey a cell identifier to a UE. The scrambling may be performed in time or frequency domain. The scrambling may be binary or poly-phase. The selection of the scrambling sequence to be used to construct the SSS can be made a function of both physical cell identifier (PCID) and SFN location. When scrambling is used, symbol-wise cyclic shifts may be selected from a set of pre-determined values. The cyclic shift may be configured as a constant or may be symbol specific. The cyclic shift can be applied in either the time domain or the frequency domain.

In another example, short ZC sequences may be used. Thus, at block 614, the eNB may use a concatenation of multiple ZC sequences, wherein the concatenated ZC sequences span a total number of tones allocated to an SSS sequence, to construct the SSS.

At block 616, the eNB may periodically permute a root index and cyclic shift mapping. For example, SSS sequences may be constructed based on the user of ZC root index and symbol-wise cyclic shifts. Potential choices for root index may be pruned, or removed to generate a subset, in order to obtain a subset unused by NB-PSS and resilient to time/frequency uncertainty. Each short ZC sequence may be mapped to one SSS symbol. The mapping of root index and cyclic shift may be permuted in a periodic manner. For example, the periodicity of permutation may be configurable within one SSS transmission. The permutation may change per symbol, or every n symbols.

The eNB may apply an interleaver per symbol to a coded SSS sequence at block 618, as a part of constructing the SSS. Thus, a symbol-wise interleaver may be applied on top of a coded SSS sequence at block 620. Additionally, the eNB may apply a code cover per symbol to a coded SSS sequence. The code cover may be binary or poly-phase. Thus, a symbol-wise binary or poly-phase code cover can be applied on top of a coded SSS sequence. When using short ZC sequences, the eNB may also use scrambling at block 622 to construct the SSS. The scrambling may be similar to that described in connection with block 612.

Constructing the SSS may also include using a mapping of at least one ZC root index and at least one cyclic shift at block 624, wherein the mapping is constructed based on error correction coding.

An encoding alphabet used for the mapping may be a code symbol alphabet, the code symbol alphabet comprise at least one of a binary alphabet having 16 codewords; a binary alphabet having 4 codewords; an octa alphabet having 16 codewords; an octa alphabet having 4 codewords; a hexa alphabet having 16 codewords; or a hexa alphabet having 4 codewords.

Using the mapping at block 624 may include mapping the code symbol alphabet to at least one of a plurality of sequence properties, the sequence properties including at least one of a cyclic shift within a symbol in frequency; a cyclic shift within the symbol in time; selection of a sequence root; or scrambling across different symbols.

Input information for the SSS may be mapped to information bits of the SSS using a one-to-one structure or a one-to-many structure.

Figure 7:
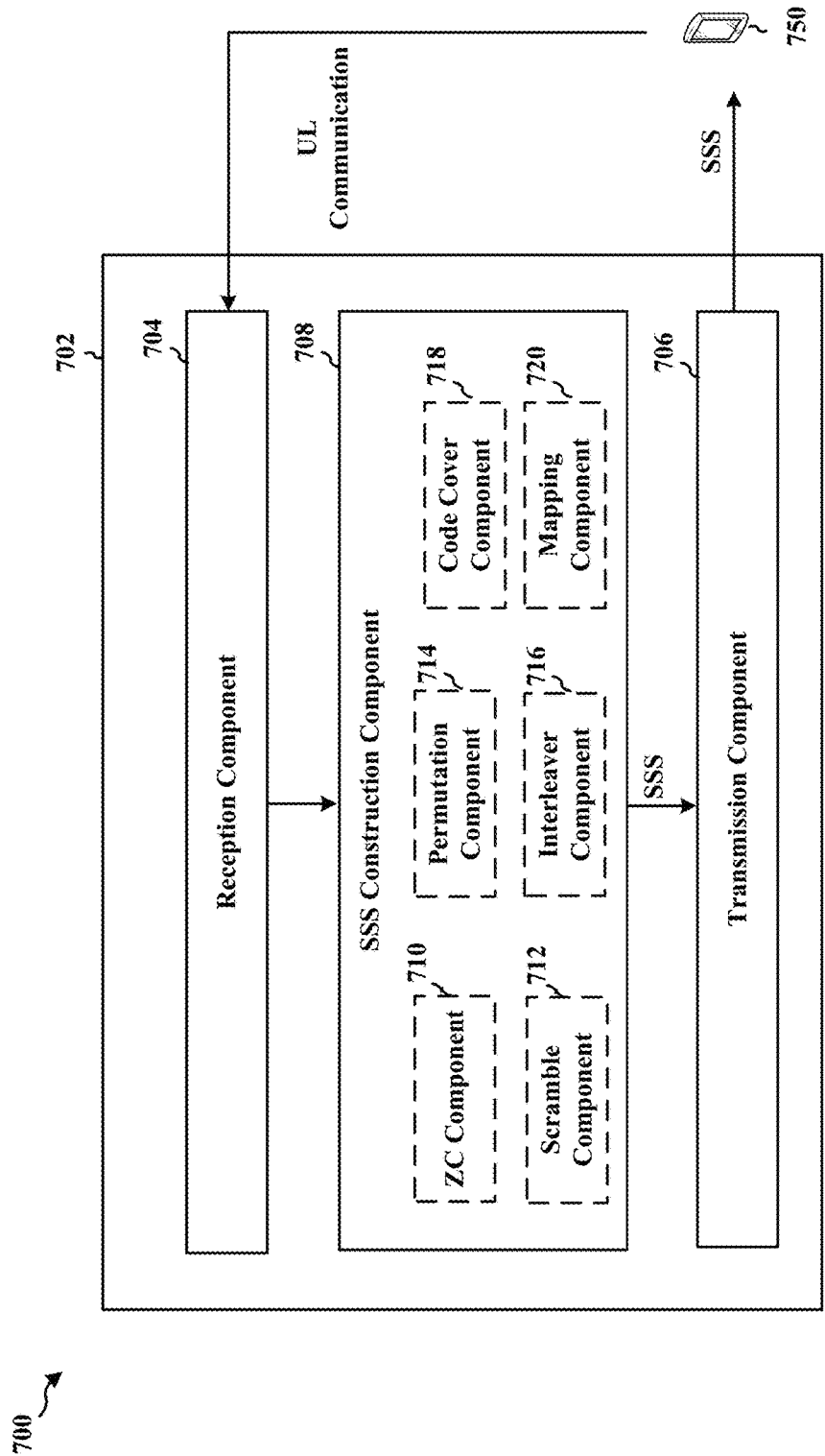
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be an eNB (e.g., base station 102, 180, eNB 310, 402, 404, 406, 1050, apparatus 702, 702'). The apparatus includes a reception component 704 that receives communication. This communication may be UL communication from a receiver 750, e.g., a UE (e.g., UE 104, 410, 350, apparatus 1002, 1002'). The apparatus includes a transmission component 706 that transmits DL communication, such as an SSS signal. The transmission component 706 may be configured to transmit a NB SSS to a receiver 750. The apparatus includes an SSS construction component 708 that constructs an SSS using a ZC root index, a scrambling code, a cyclic shift or phase ramping sequence, and an interleaving sequence, wherein a combination of the ZC root index, the scrambling code index, the cyclic shift or phase ramping sequence index, and the interleaving sequence index signals information for a cell identifier (e.g., PCID) and frame timing.

The SSS construction component may include ZC component 710 that selects the ZC sequence to be used for SSS construction. The ZC component 710 may construct a long ZC sequence that spans a total number of tones allocated to an SSS sequence. Alternately, the ZC component 710 may use shorter ZC sequences and may use a concatenation of multiple ZC sequences, wherein the concatenated ZC sequences span a total number of tones allocated to an SSS sequence.

The SSS constructions component may include a permutation component 714 that periodically permutes a root index and cyclic shift mapping, a scramble component 712 that scrambles the SSS sequence being constructed, and interleaving component 716 that applies an interleaver per symbol to a coded SSS sequence, and a code cover component 718 that applies a code cover per symbol to a coded SSS sequence, and a mapping component 720 that uses a map of at least one ZC root index and at least one cyclic shift to construct the SSS. The code cover component may apply a binary or a poly-phase code cover to the coded SSS sequence.

The apparatus may include additional components that perform each of the blocks of the algorithm in the aforementioned flowchart of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
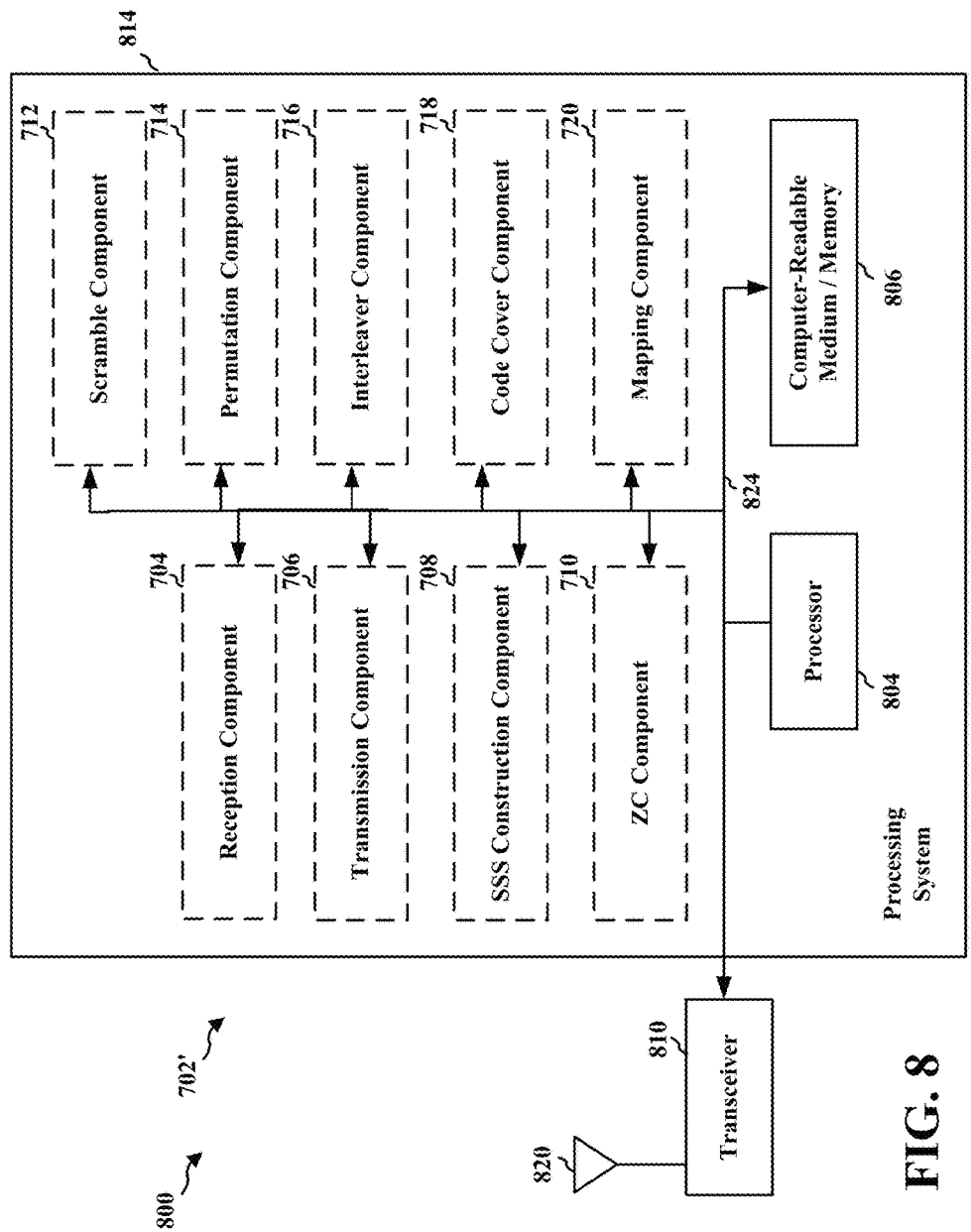
FIG. 8 is a diagram illustrating an example of a hardware implementation for an apparatus employing a processing system.

FIG. 8 is a diagram 800 illustrating an example of a hardware implementation for an apparatus 702' employing a processing system 814. The apparatus 702' may correspond to, e.g., base station 102, 180, eNB 310, 402, 404, 406, 1050. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the eNB 310 and may include the memory 376 and/or at least one of the TX processor 316, the RX processor 370, and the controller/processor 375.

In one configuration, the apparatus 702/702' for wireless communication includes means for means for constructing a secondary synchronization signal (SSS) using a Zadoff-Chu (ZC) root index and a per symbol cyclic shift, means for transmitting the SSS using a NB, means for constructing a ZC sequence that spans a total number of tones allocated to an SSS sequence, means for scrambling, means for periodically permuting a root index and cyclic shift mapping, means for applying an interleaver per symbol to a coded SSS sequence, means for applying a binary or poly-phase code cover per symbol to a coded SSS sequence, and means for mapping of at least one ZC root index and at least one cyclic shift.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
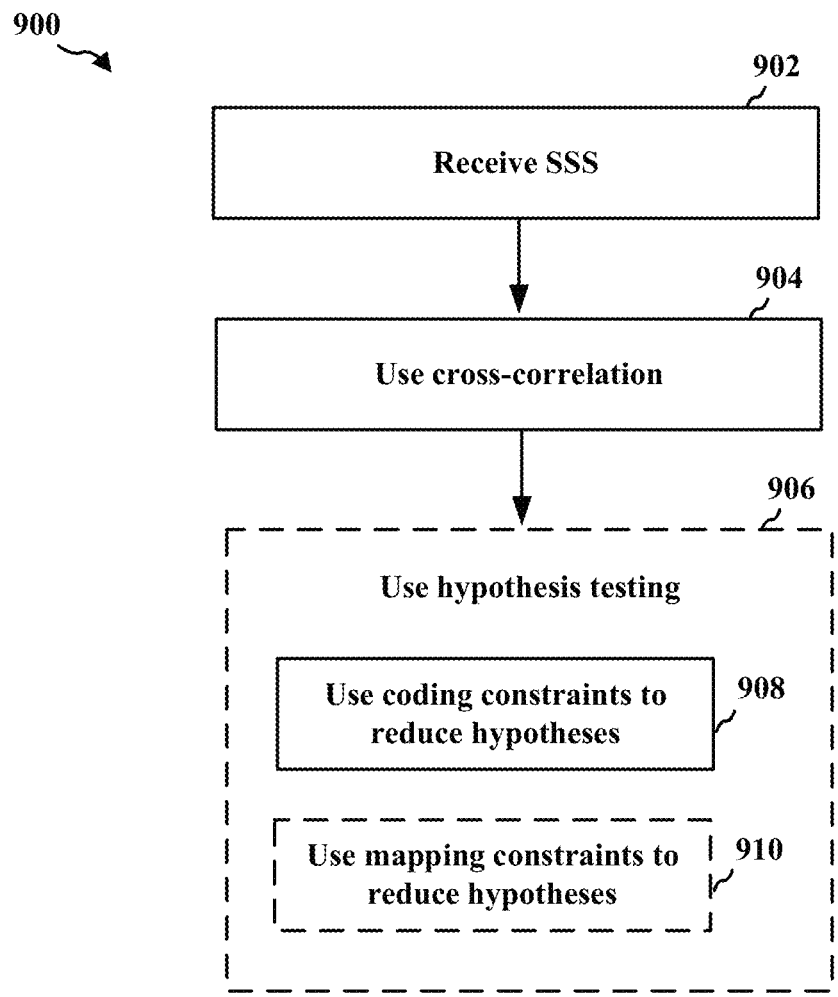
FIG. 9 is a flowchart of a method of wireless communication in accordance with aspects presented herein.

FIG. 9 is a flowchart 900 of a method of wireless communication. The method may be performed by a receiver, such as receiver 410, apparatus 1002, 1002'. The receiver may be a UE (e.g., UE 104, 410, 350, 750, apparatus 1002, 1002').

At block 902, the receiver receives an SSS comprising multiple symbols from an eNB (e.g., base station 102, 180, eNB 310, 402, 404, 406, 1050, apparatus 702, 702').

At block 904, the receiver uses cross-correlation at each symbol of the SSS to decode the SSS in order to determine a cell ID, e.g., PCID, and frame timing information (e.g., SFN timing information). The magnitude of the symbol-wise cross correlation may provide soft information on SSS detection.

At block 906, the receiver may also use hypothesis testing for a plurality of hypotheses to decode the SSS. The receiver may reduce a number of the plurality of hypotheses to be tested at block 906 using coding constraints at block 908 or mapping constraints at block 910.

A sum of cross-correlation may be coherently combined. The symmetric property of cross-correlation, scrambling, and/or cyclic shifting may be exploited to reduce the number of arithmetic operations performed by the receiver in order to decode the SSS.

For example, the mapping constraint at block 910 may comprise using an SSS-based processing to select a subset of the plurality of hypotheses for the hypothesis testing.

The SSS-based processing may include calculating a cross-correlation for each of a plurality of candidate SSS sequences for different SFNs at a plurality of boundaries within a time interval. Then, the UE may index the calculated cross correlations, compare a pattern of the indexed cross correlations, and select the subset of the plurality of hypotheses based on a relationship to an SSS mapping table.

In a different example, using coding constraints at 908 may include using physical broadcast channel (PBCH) processing to select a subset of the plurality of hypotheses for the hypothesis testing. The PBCH processing may include, e.g., comparing a PBCH decoding result for different System Frame Number (SFN) timing hypotheses; and selecting the subset of the plurality of hypotheses based on a relationship to the PBCH decoding result.

Figure 10:
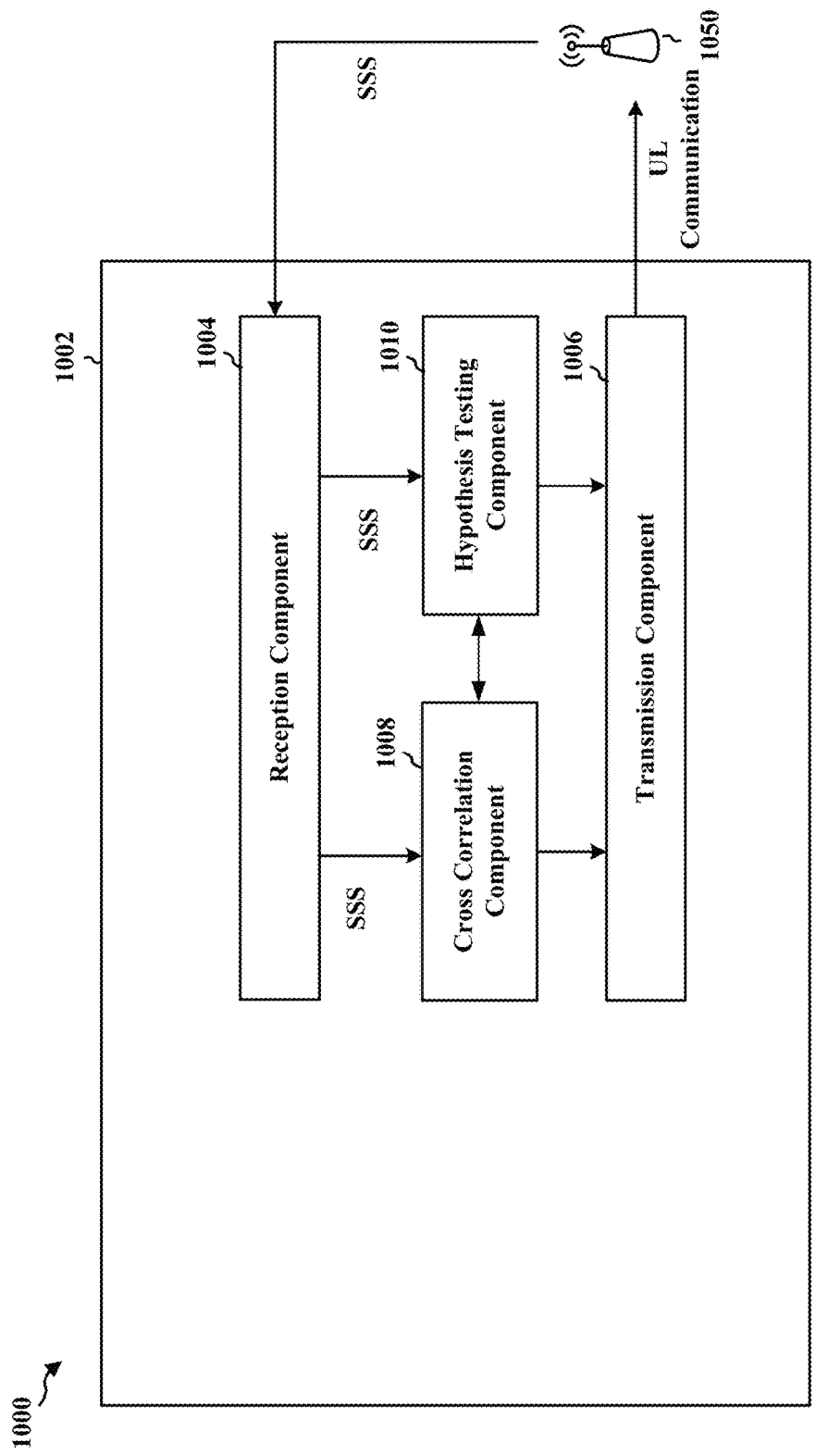
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a receiver, e.g., a UE (e.g., UE 104, 410, 350, 750, apparatus 1002'). The apparatus includes a reception component 1004 that receives an SSS from eNB 1050, and a transmission component 1006 that transmits UL communication to eNB 1050. The apparatus 1002 may also include a cross-correlation component that receives the SSS received by the receiver component and uses cross-correlation 1008 at each symbol of the SSS to decode the SSS. The apparatus 1002 may also include a hypothesis testing component 1010 that uses hypothesis testing for a plurality of hypotheses to decode the SSS received by the receiver component 1004. The hypothesis testing component 1010 may use coding or mapping constraints to reduce a number of the plurality of hypotheses to be tested.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
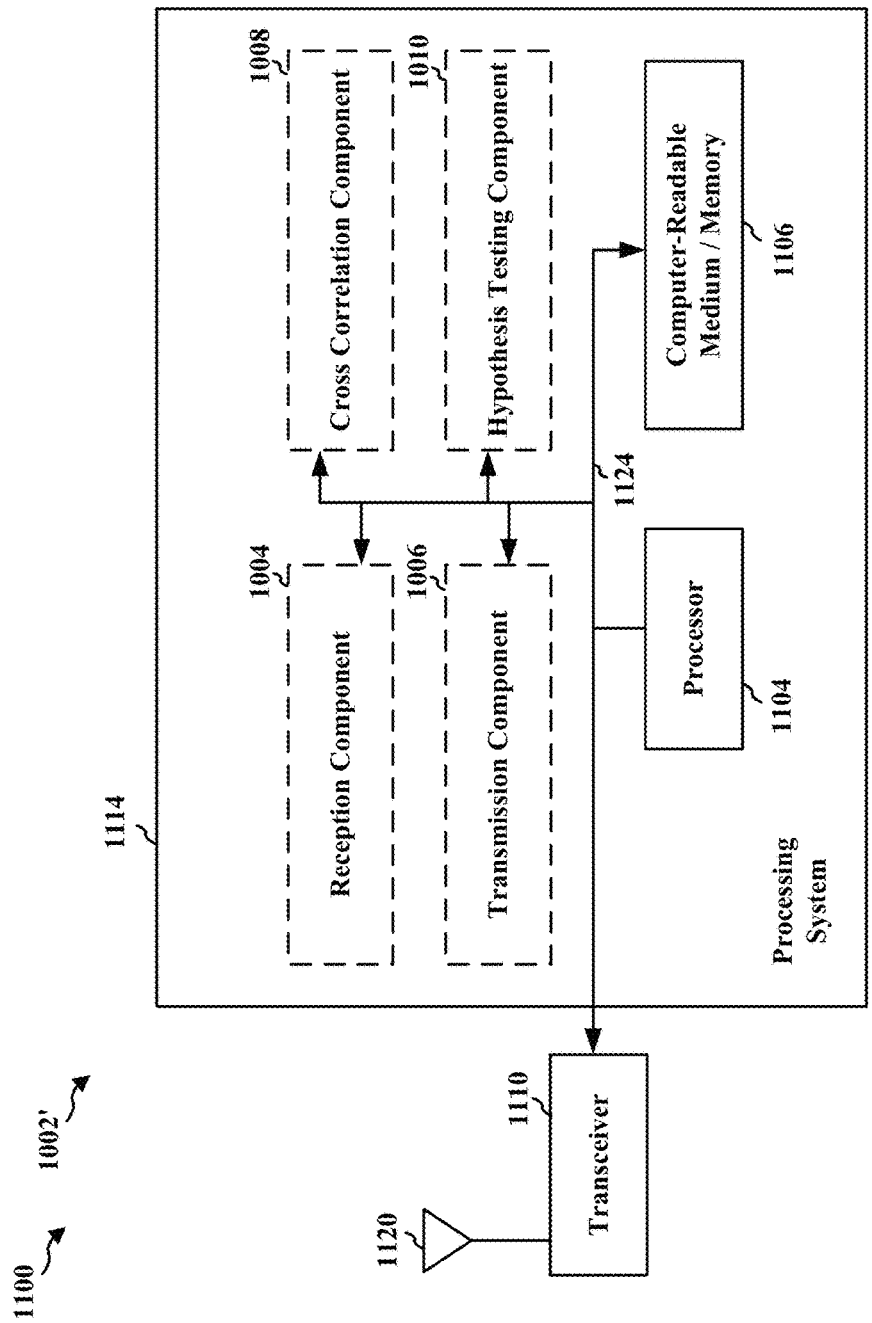
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for means for receiving a secondary synchronization signal (SSS) comprising multiple symbols; and means for using cross-correlation at each symbol of the SSS to decode the SSS, and means for using hypothesis testing for a plurality of hypotheses to decode the SSS.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Resource Mapping for NB-PSS and NB-SSS Signals

NB-IoT may have multiple operation modes, e.g., in-band mode, guard band mode, and stand-alone mode. 180 KHz UE RF/BB bandwidth may be used for both downlink and uplink NB-IoT transmissions. Due to the bandwidth limitation, NB-IoT systems require new design for SYNC signals, which may include a single NB-SYNC channel. NB-SSS detection may use time and frequency references established by NB-PSS. Moreover, NB-SSS may be used to fine tune the residue timing and frequency offsets.

For NB-IoT cell search, robust performance and low-complexity implementation are important for NB-SYNC signals. Presented herein are aspects for NB-PSS and NB-SSS sequences, which facilitate low-complexity implementation and provide robust cell search performance for low-cost UEs. Details are provided regarding transmitter and receiver processing, performance evaluations and complexity analysis. Aspects of the proposed NB-PSS sequence enable decoupled estimation of timing and frequency offsets, which provide beneficial linear unbiased estimation of CFO and ML estimation of timing offset. Furthermore, retransmission of PSS sequences can be coherently combined to boost the diversity gain, which may be important for extended coverage and/or low SINR scenarios. For three deployment modes and coupling losses up to e.g. 164 dB, the proposed aspects may provide better/comparable performance and significantly lower implementation complexity.

In order to avoid potential interference between NB-IoT and legacy LTE for in-band deployment, the first three OFDM symbols of a subframe may be excluded for resource mapping. To improve the reliability of cell search, NB-SYNC signals may be re-transmitted periodically. The periodicity may be configurable, e.g., depending on the coverage and deployment mode of NB-IoT systems.

Figure 14:
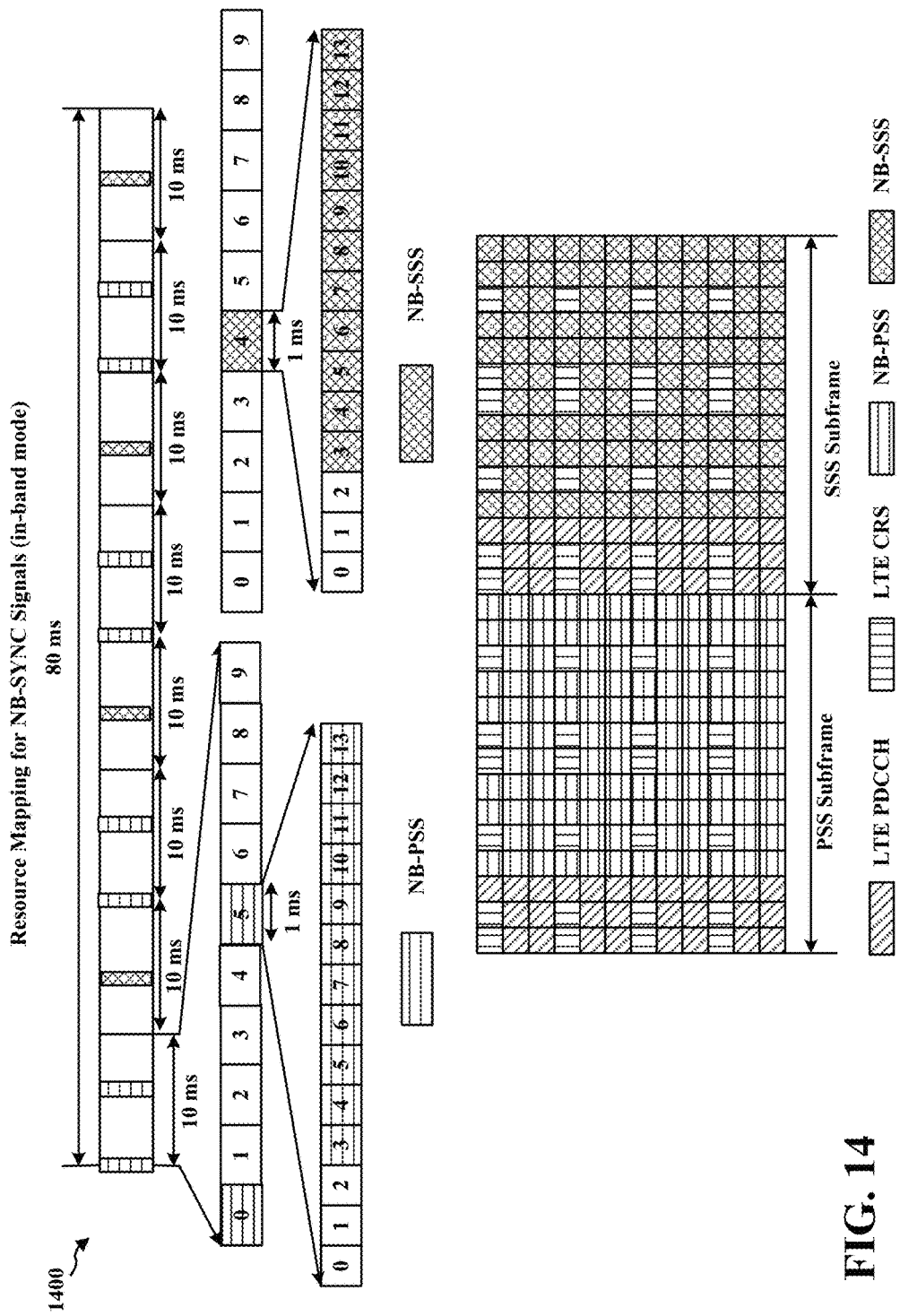
FIG. 14 illustrates an example subframe structure for in-band NB-PSS and NB-SSS in accordance with aspects presented herein.

FIG. 14 shows an example subframe structure 1400 for in-band deployment, where NB-PSS and NB-SSS signals occupy the last 11 OFDM symbols of a subframe and are punctured by CRS. Thus, for LTE, NB-SSS and NB-PSS may occupy the entire subframe allocated for a SYNC channel, but may effectively exclude symbol 0 to symbol 2 in order to avoid conflicts with CRS and PDCCH. Besides, NB-IoT PSS signal may repeated on subframe 0 and 5 of radio frames with odd index, and NB-SSS signal may be transmitted on subframe 4 of radio frames with even index. For guard-band and stand-alone deployments, there may be no need to consider CRS punctures, but the first three OFDM symbols may still be excluded in resource mapping.

NB-PSS Sequences

An NB-PSS sequence may be constructed by concatenation of short Zadoff-Chu sequences and may employ a dual-layer design for base sequence (e.g., across 11 or 12 tones of 1 PRB in the frequency domain) and code cover (across 11 OFDM symbols in the time domain). A base NB-PSS sequence may be constructed in the time domain by interpolating a Zadoff-Chu sequence of length-K (K=11 or 12) with good correlation properties in both the time and the frequency domains. Each PSS symbol may embrace one base sequence having CP included. A one-to-one mapping from PSS symbols to base sequences may be governed by a Pseudo-Noise (PN)-like code cover, e.g., of length 11, for example. The code cover may comprise a binary sequence $\{S_l; S_l=\pm 1$ and $1 \leq l \leq 11\}$ with a random-like pattern, where $S_l$ is the l-th symbol of the code cover sequence and l is the symbol index of the code cover sequence. A pattern of code cover may be optimized to improve the accuracy and reliability of cell acquisition.

Figure 15:
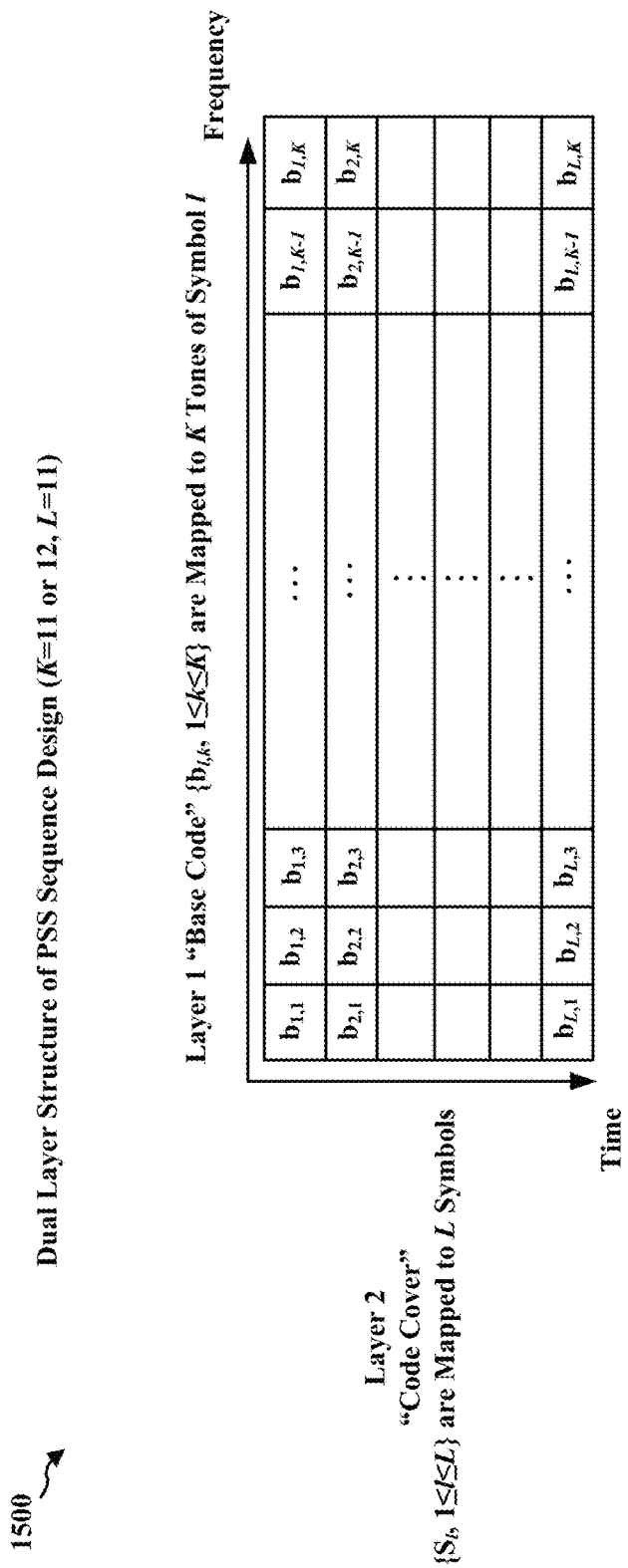
FIG. 15 illustrates a dual-layer structure of an NB-PSS sequence, in accordance with aspects presented herein.

FIG. 15 illustrates the dual-layer structure 1500 of the NB-PSS sequence, where a base sequence element $b_{l,k}$ is mapped to the k-th tone of l-th PSS symbol. In FIG. 15, the Dual Layer Structure of PSS Sequence Design (K=11 or 12, L=11), where L equals the length of a NB-PSS sequence. In a first layer, e.g., Layer 1, the Base Code $\{b_{l,k}, 1 \leq k \leq K\}$ are Mapped to K Tones of Symbol l, where k is a tone index of the base sequence mapped to a PSS signal, which occupies K subcarriers in frequency and spans L symbols in time. In a second layer, e.g., Layer 2, the Co are Mapped to L Symbols.

Figure 16:
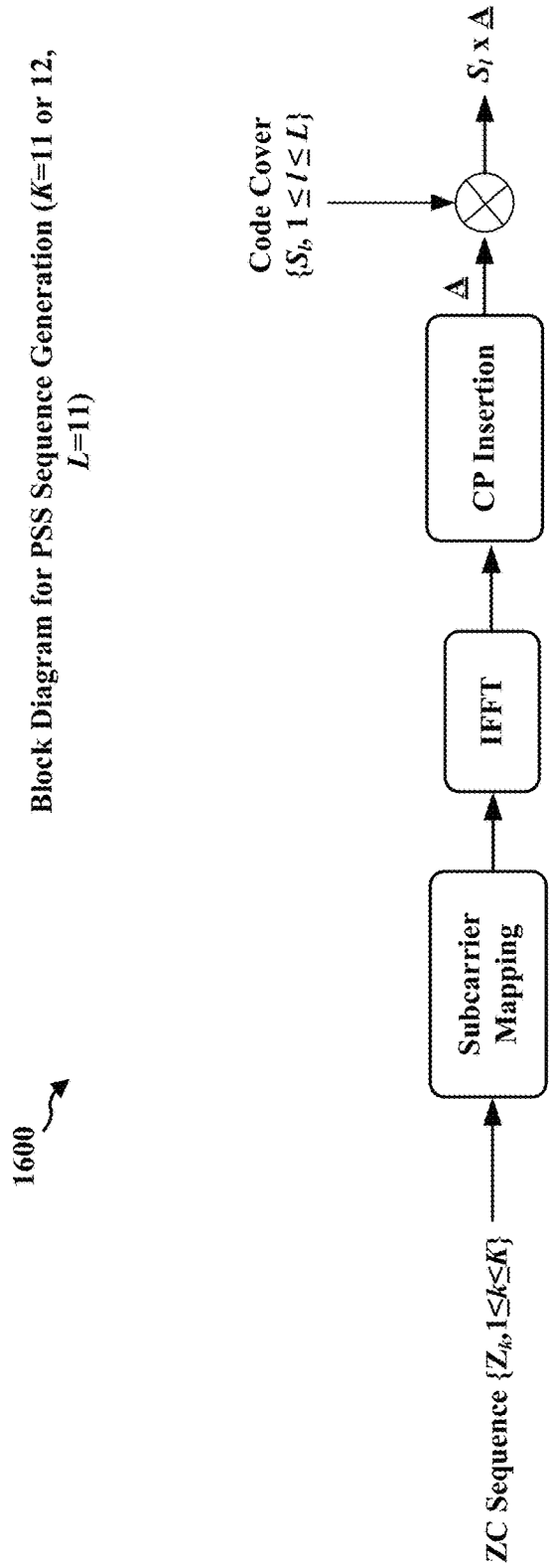
FIG. 16 illustrates a block diagram for PSS sequence generation in accordance with aspects presented herein.

FIG. 16 shows the block diagram 1600 for PSS sequence generation. Starting from a length-K ZC sequence, tone selection/CRS puncture may be performed through subcarrier mapping. IFFT may be employed to generate the time domain samples for each PSS symbol. For brevity, a shorthand notation for N samples of a PSS symbol can be given by:

$$\underline{A} \triangleq [a_1 a_2 \ldots a_N]$$

Table 1 illustrates a concatenation of 11 NB-PSS symbols corresponding to a code cover pattern given by [1 1 −1 −1 −1 1 1 −1 −1 −1]. CRS puncture is not considered in this example for simplicity. When the sampling frequency is 1.92 MHz, there may be N=137 samples in one PSS symbol, which can be obtained by size-128, zero-padded IFFT plus a CP of size-9. When it is desirable to comply with LTE symbol boundaries and maintain the periodical sequence structure as well, the PSS sequence may for formatted at the beginning of the $3^{rd}$ OFDM symbol, and one more sample may be stacked at the end of the last PSS symbol. In this example, there will be 137×11+1 samples occupying the last 11 OFDM symbols of a PSS subframe. In particular, when the code cover is chosen as an all-one sequence [1 1 1 1 1 1 1 1 1 1 1], the NB-PSS sequence will repeat the same symbol pattern eleven times.

TABLE 1

Example of NB-PSS Symbol Concatenation

| Symbol Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| PN-like Code Cover | | | 1 | 1 | −1 | −1 | −1 | 1 | 1 | −1 | −1 | −1 | −1 | |
| Sub-vector for PSS symbols | | | A | A | −A | −A | −A | A | A | −A | −A | −A | −A | |

Thus, for the proposed NB-PSS sequence design, each PSS symbol may embrace a full ZC sequence, therefore it may preserve the good correlation properties on symbol basis. The application of code cover randomizes the symbol pattern, therefore the good correlation properties are extended across symbols. The proposed NB-PSS sequence exhibits a periodical structure, which may be exploited to achieve Best Linear Unbiased Estimation (BLUE). In addition to the constant envelope of ZC sequence, overlap & add operations can be applied at PSS symbol boundaries to further reduce PAPR and CM values.

Low-Complexity Time and Frequency Acquisition

For NB-IoT cell search, robust performance and low-complexity implementation are two important objectives for the NB-PSS signal. For initial cell acquisition, large CFO up to ±20 ppm plus and continuous time drift have to be dealt with by NB-PSS for reliable and fast frame start detection. The NB-PSS sequence described herein facilitates a low-complexity cell searcher algorithm. Due to the dual layer structure, decoupled time and frequency estimators can be constructed, which enables fast and robust SYNC signal detection for initial and non-initial cell acquisition. Additionally, through judicious choice of code cover, accuracy of timing and frequency synchronization can be enhanced for both single cell and multi-cell scenarios.

Refined Time and Frequency Offset Estimation

Figure 17:
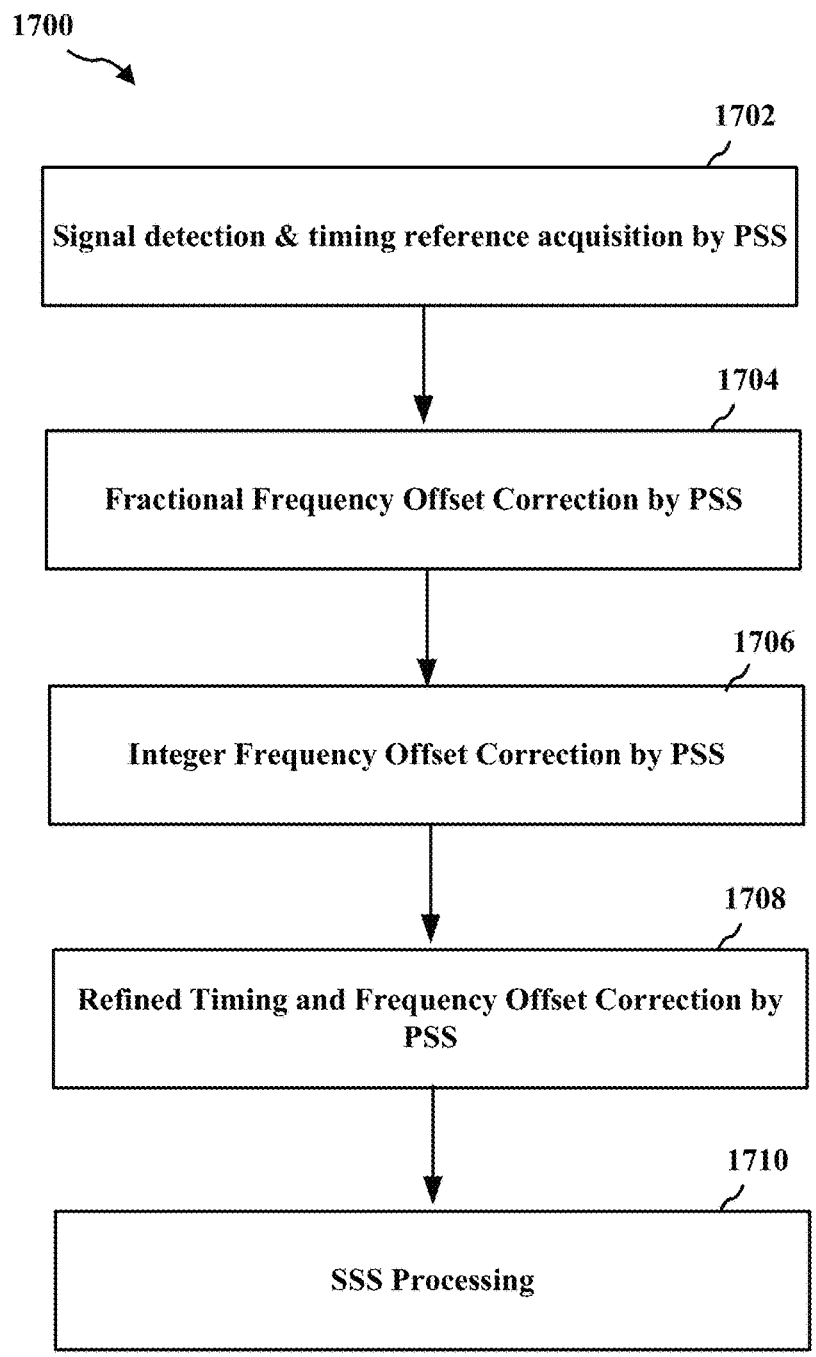
FIG. 17 illustrates a flowchart for NB-PSS and NB-SSS signal processing in accordance with aspects presented herein.

Refined time and frequency offset estimation may be obtained through cross correlation with local copy of PSS sequence. Following the timing and frequency reference established by PSS signal, SSS processing can be conducted. The major tasks of SSS processing includes the detection of cell ID and other system information. Additionally, it can also be used for the tracking of residual time and frequency offset. FIG. 17 presents a flowchart 1700 for NB-PSS and NB-SSS sequence processing.

At block 1702, a UE performs signal detection at timing reference acquisition by PSS, which may include coherent combining of sliding auto correction, e.g., for 240 KHz.

At block 1704, the UE performs fractional frequency offset correction by PSS, which may include exploiting peak information of timing offset estimator.

At block 1706, the UE performs integer frequency offset correction by PSS, which may include M-ary hypothesis testing and/or cross-correlation, e.g., for 240 KHz.

At block 1708, the UE performs refined timing and frequency offset correction by PSS, which may include cross-correlation, e.g., at 1.92 MHz. The UE then performs SSS processing at block 1710, e.g., at 1.92 MHz.

NB-SSS Sequence Design

Similar to NB-PSS, the resource allocation for NB-SSS signal may be configured to avoid conflict with legacy LTE, as shown in FIG. 14. The proposed NB-SSS sequence may be constructed according to any of a number of features presented herein, e.g., including concatenation of short ZC sequences (e.g. K=11) with different roots and cyclic shifts. The generation of NB-SSS symbol may follow similar procedures to those described in connection with the NB-PSS signal, e.g., except for the use of code cover.

TABLE 2

| Root/Cyclic Shift assignment of SSS Sequences | | | | | |
|---|---|---|---|---|---|
| Assignment | 1 | 2 | 3 | ... | M |
| Root | $u_1$ | $u_2$ | $u_3$ | ... | $u_M$ |
| Cyclic Shift | $S_1$ | $S_2$ | $S_3$ | ... | $S_M$ |

Table 2 illustrates the mapping of roots and cyclic shifts to a SSS sequence. Similar to NB-PSS, NB-SSS sequence may occupy M=11 OFDM symbols in time domain. The detection of NB-SSS signal can be achieved by cross correlation with a clean reference signal, given the timing and frequency reference has been established by NB-PSS signal.

The cell search procedures of NB-IoT devices may comprise 4 operations, namely: frame start detection (a.k.a PSS signal detection), symbol and frame timing offset estimation, CFO estimation, and physical cell ID identification, e.g., similar to legacy LTE cell search procedures. The first three operations may involve NB-PSS processing, whereas the last one may comprise NB-SSS processing Due to the dual layer structure, timing and frequency offset estimation can be decoupled in searcher implementation. Therefore, cell detection (a.k.a. frame start detection) can be achieved without estimating the CFO, which makes the performance robust against the large frequency uncertainties typical for low-cost devices. In addition, multiple PSS re-transmissions can be "coherently" combined by leveraging the quasi-stationary phase rotation between adjacent PSS symbol. Both properties are helpful to reduce the latency, false alarm and miss detection of cell searcher.

Once the timing reference is established, the fractional part of CFO can be estimated via the constant-phase rotation between adjacent PSS symbols. The phase rotation can be obtained directly from the output of sliding auto-correlator. To enlarge the pull-in range of CFO estimation, time domain cross-correlation can be performed using a clean reference signal rotated by ±15×(128/137) KHz, followed by a binary hypothesis testing. Same approach can be used to handle initial CFO size larger than 20 ppm.

In order to achieve robust time and frequency synchronization under the constraints of low-cost design and low-complexity implementation, as well as to facilitate early indication of deployment/duplexing mode, for NB-PSS and NB-SSS sequences, a short Zadoff-Chu sequence in each OFDM symbol may be used for NB-PSS/SSS sequence to preserve the good correlation properties in both time and frequency domain, as well as low PAPR/CM property. A binary code cover may be applied across different PSS symbols to enhance the performance of cell search. The required searcher complexity is significantly lower than that of other implementations based on cross correlation with multiple long sequence, while achieving the needed residual timing error, residual frequency offset, and network synchronization within max latency. As a consequence, the searcher performance of is impacted by the accuracy/implementation of multiple correlators and accumulators.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of Narrow Band (NB) wireless communication, comprising:
   constructing a secondary synchronization signal (SSS) using a Zadoff-Chu (ZC) root index, a scrambling code, a cyclic shift or phase ramping sequence, and an interleaving sequence, wherein a combination of the ZC root index, the scrambling code index, the cyclic shift or phase ramping sequence index, and the interleaving sequence index signals information for a cell identifier (ID) and frame timing information, wherein constructing the SSS includes using a concatenation of multiple ZC sequences that span a total number of tones allocated to an SSS sequence and periodically permuting a root index and cyclic shift mapping; and
   transmitting the SSS using a NB.

2. The method of claim 1, wherein constructing the SSS includes constructing a ZC sequence that spans the total number of tones allocated to the SSS sequence.

3. The method of claim 2, wherein the ZC sequence is truncated or cyclically extended to fit the total number of tones allocated to the SSS sequence.

4. The method of claim 2, wherein the cell ID comprises a physical cell identifier.

5. The method of claim 1, wherein constructing the SSS includes applying an interleaver per symbol to a coded SSS sequence.

6. The method of claim 1, wherein constructing the SSS includes applying a binary or poly-phase code cover per symbol to a coded SSS sequence.

7. The method of claim 1, wherein constructing the SSS includes:
   using a mapping of at least one ZC root index and at least one cyclic shift, wherein the mapping is constructed based on error correction coding.

8. The method of claim 7, wherein an encoding alphabet used for the mapping includes using a code symbol alphabet, the code symbol alphabet comprising at least one of:
   a binary alphabet having 16 codewords;
   a binary alphabet having 4 codewords;
   an octa alphabet having 16 codewords;
   an octa alphabet having 4 codewords;
   a hexa alphabet having 16 codewords; or
   a hexa alphabet having 4 codewords.

9. The method of claim 7, wherein using the mapping includes mapping a code symbol alphabet to at least one of a plurality of sequence properties, the sequence properties including at least one of:
   a cyclic shift within a symbol in frequency;
   a cyclic shift within the symbol in time;
   selection of a sequence root; or
   scrambling across different symbols.

10. The method of claim 7, wherein input information for the SSS is mapped to information bits of the SSS using at least one of:
    a one-to-one structure; or
    a one-to-many structure.

11. An apparatus for Narrow Band (NB) wireless communication, comprising:
    a memory; and
    at least one processor coupled to the memory and configured to:
      construct a secondary synchronization signal (SSS) using a Zadoff-Chu (ZC) root index, a scrambling code, a cyclic shift or phase ramping sequence, and an interleaving sequence, wherein a combination of the ZC root index, the scrambling code index, the cyclic shift or phase ramping sequence index, and the interleaving sequence index signals information for a cell identifier (ID) and frame timing information, wherein constructing the SSS includes using a concatenation of multiple ZC sequences that span a total number of tones allocated to an SSS sequence, and periodically permuting a root index and cyclic shift mapping; and
      transmit the SSS using a NB.

12. The apparatus of claim 11, wherein the at least one processor is further configured to construct a ZC sequence that spans the total number of tones allocated to the SSS sequence.

13. The apparatus of claim 12 wherein the ZC sequence is truncated or cyclically extended to fit the total number of tones allocated to the SSS sequence.

14. The apparatus of claim 12, wherein the cell ID comprises a physical cell ID.

15. The apparatus of claim 11, wherein the at least one processor is further configured to apply an interleaver per symbol to a coded SSS sequence.

16. The apparatus of claim 11, wherein the at least one processor is further configured to apply a binary or polyphase code cover per symbol to a coded SSS sequence.

17. A method of wireless communication, comprising:
receiving a secondary synchronization signal (SSS) comprising multiple symbols; and
using cross-correlation at each symbol of the SSS to decode the SSS in order to determine a cell identifier (ID) and frame timing information,
wherein the cell ID and the frame timing information are determined based on a combination of a Zadoff-Chu (ZC) root index, a scrambling code index, a cyclic shift or phase ramping sequence index, and an interleaving sequence index used to construct the SSS, and
wherein the SSS is constructed by a concatenation of multiple ZC sequences that span a total number of tones allocated to an SSS sequence and by periodically permuting a root index and cyclic shift mapping.

18. The method of claim 17, further comprising:
using hypothesis testing for a plurality of hypotheses to decode the SSS; and
using coding or mapping constraints to reduce a number of the plurality of hypotheses to be tested.

19. The method of claim 18, wherein an SSS-based processing is used to select a subset of the plurality of hypotheses for the hypothesis testing, the SSS-based processing comprising calculating a cross-correlation for each of a plurality of candidate SSS sequences for different System Frame Numbers (SFNs) at a plurality of boundaries within a time interval.

20. The method of claim 19, further comprising:
indexing the calculated cross correlations;
comparing a pattern of the indexed cross correlations; and
selecting the subset of the plurality of hypotheses based on a relationship to an SSS mapping table.

21. The method of claim 18, wherein physical broadcast channel (PBCH) processing is used to select a subset of the plurality of hypotheses for the hypothesis testing.

22. The method of claim 21, wherein the PBCH processing comprises:
comparing a PBCH decoding result for different System Frame Number (SFN) timing hypotheses; and
selecting the subset of the plurality of hypotheses based on a relationship to the PBCH decoding result.

23. An apparatus for wireless communication, comprising:
a memory; and
at least one processor coupled to the memory and configured to:
receive a secondary synchronization signal (SSS) comprising multiple symbols; and
use cross-correlation at each symbol of the SSS to decode the SSS in order to determine a cell identifier (ID) and frame timing information,
wherein the cell ID and the frame timing information are determined based on a combination of a Zadoff-Chu (ZC) root index, a scrambling code index, a cyclic shift or phase ramping sequence index, and an interleaving sequence index used to construct the SSS, and
wherein the SSS is constructed by a concatenation of multiple ZC sequences that span a total number of tones allocated to an SSS sequence and by periodically permuting a root index and cyclic shift mapping.

24. The apparatus of claim 23, wherein the at least one processor is further configured to:
use hypothesis testing for a plurality of hypotheses to decode the SSS; and
use coding or mapping constraints to reduce a number of the plurality of hypotheses to be tested.

25. The apparatus of claim 24, wherein a subset of the plurality of hypotheses for the hypothesis testing are selected based on at least one of SSS-based processing and physical broadcast channel (PBCH) processing.

* * * * *